(12) United States Patent
Sun et al.

(10) Patent No.: US 10,841,953 B2
(45) Date of Patent: Nov. 17, 2020

(54) RECEIVER-BASED LISTEN BEFORE TALK TECHNIQUES IN SHARED MILLIMETER WAVE RADIO FREQUENCY SPECTRUM

(71) Applicant: QUALCOMM Incorporated, San Diego, CA (US)

(72) Inventors: Jing Sun, San Diego, CA (US); Xiaoxia Zhang, San Diego, CA (US); Arumugam Chendamarai Kannan, San Diego, CA (US); Tamer Kadous, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/371,294

(22) Filed: Apr. 1, 2019

(65) Prior Publication Data
US 2019/0357255 A1 Nov. 21, 2019

Related U.S. Application Data

(60) Provisional application No. 62/674,554, filed on May 21, 2018.

(51) Int. Cl.
*H04W 4/00* (2018.01)
*H04W 74/08* (2009.01)
(Continued)

(52) U.S. Cl.
CPC ....... *H04W 74/0816* (2013.01); *H04L 1/0003* (2013.01); *H04L 5/0053* (2013.01);
(Continued)

(58) Field of Classification Search
None
See application file for complete search history.

(56) References Cited

U.S. PATENT DOCUMENTS

2016/0286545 A1\* 9/2016 Luo .................. H04L 1/1671
2017/0013470 A1\* 1/2017 Sun .................. H04W 74/0816
(Continued)

FOREIGN PATENT DOCUMENTS

WO WO-2016153804 A1 9/2016
WO WO-2017007579 A1 1/2017

OTHER PUBLICATIONS

International Search Report and Written Opinion—PCT/US2019/025369—ISA/EPO—dated Jun. 11, 2019.

*Primary Examiner* — Clemence S Han
(74) *Attorney, Agent, or Firm* — Holland & Hart LLP

(57) ABSTRACT

Methods, systems, and devices for wireless communications are described for receiver-based listen-before-talk (LBT) in systems that use shared radio frequency spectrum. A scheduling device may provide a pre-grant indication of a data transmission. The data transmission may be transmitted via a shared millimeter wave (mmW) radio frequency spectrum band, and a LBT procedure may be performed at a receiving device responsive to the pre-grant indication, to determine that the shared mmW radio frequency spectrum band is available for the data transmission. An indication may be transmitted to a transmitting device to indicate that the receiving device has successfully performed the LBT procedure, which may act as a trigger for the transmitting device to start the data transmission.

60 Claims, 18 Drawing Sheets

(51) Int. Cl.
*H04L 1/00* (2006.01)
*H04W 74/00* (2009.01)
*H04L 5/00* (2006.01)
*H04W 24/10* (2009.01)
*H04W 72/04* (2009.01)

(52) U.S. Cl.
CPC ......... *H04W 24/10* (2013.01); *H04W 74/006* (2013.01); *H04W 72/0446* (2013.01)

(56) References Cited

U.S. PATENT DOCUMENTS

| | | | |
|---|---|---|---|
| 2017/0013479 A1* | 1/2017 | Sun | H04W 24/08 |
| 2017/0202022 A1* | 7/2017 | Chendamarai Kannan | H04W 72/0446 |
| 2017/0310426 A1* | 10/2017 | Fan | H04L 1/0013 |
| 2017/0331577 A1* | 11/2017 | Parkvall | H04L 5/0053 |
| 2017/0331670 A1* | 11/2017 | Parkvall | H04J 11/0056 |
| 2018/0077725 A1* | 3/2018 | Sun | H04W 74/0816 |
| 2018/0098335 A1* | 4/2018 | Sun | H04B 7/0491 |
| 2018/0124820 A1* | 5/2018 | Sun | H04L 5/001 |
| 2018/0131499 A1* | 5/2018 | Zhang | H04W 72/0446 |
| 2018/0146506 A1* | 5/2018 | Zhang | H04L 5/0053 |
| 2018/0167848 A1* | 6/2018 | Lei | H04W 28/26 |
| 2018/0167941 A1* | 6/2018 | Zhang | H04L 5/0048 |
| 2018/0176946 A1* | 6/2018 | Sun | H04W 28/26 |
| 2018/0255561 A1* | 9/2018 | Barghi | H04W 72/1231 |
| 2018/0255584 A1* | 9/2018 | Sun | H04W 72/0453 |
| 2018/0302866 A1* | 10/2018 | Zhang | H04L 5/0035 |
| 2019/0090279 A1* | 3/2019 | Sun | H04W 16/14 |
| 2019/0174542 A1* | 6/2019 | Lei | H04W 74/0808 |

* cited by examiner

RECEIVER-BASED LISTEN BEFORE TALK TECHNIQUES IN SHARED MILLIMETER WAVE RADIO FREQUENCY SPECTRUM

CROSS REFERENCES

The present Application for Patent claims the benefit of U.S. Provisional Patent Application No. 62/674,554 by Sun, et al., entitled "RECEIVER-BASED LISTEN BEFORE TALK TECHNIQUES IN SHARED MILLIMETER WAVE RADIO FREQUENCY SPECTRUM," filed May 21, 2018, assigned to the assignee hereof, and expressly incorporated by reference herein.

BACKGROUND

The following relates generally to wireless communications, and more specifically to receiver-based listen before talk techniques in shared millimeter wave radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station and UE may utilize beamformed transmissions for communications to mitigate path losses (e.g., if the communications use higher frequencies, such as millimeter wave (mmW) frequencies). For example, a UE that includes multiple antennas may receive transmissions from a base station using various antenna configurations that determine a transmission beam. In shared or unlicensed radio frequency spectrum, some regulated domains require transmitters, such as UEs or base stations, to perform channel sensing before accessing the channel in accordance with a listen-before-talk (LBT) procedure. In some cases, such a LBT procedure may be a clear channel assessment (CCA) check using energy detection (ED) for a duration of a CCA observation time. Improvements to LBT procedures in mmW frequency spectrum may be desired.

SUMMARY

The described techniques relate to improved methods, systems, devices, and apparatuses that support receiver-based listen before talk techniques in shared millimeter wave radio frequency spectrum. Generally, the described techniques provide a pre-grant indication of a data transmission from a scheduling device. The data transmission may be transmitted via a shared millimeter wave (mmW) radio frequency spectrum band, and a listen-before-talk (LBT) procedure may be performed at a receiving device responsive to the pre-grant indication, to determine that the shared mmW radio frequency spectrum band is available for the data transmission. An indication may be transmitted to a transmitting device to indicate that the receiving device has successfully performed the LBT procedure, which may act as a trigger for the transmitting device to start the data transmission. In some cases, an acknowledgment of receipt of the pre-grant indication may be provided before the LBT procedure is completed, which may allow the transmitting device to reuse resources of the data transmission if the acknowledgment is not received.

A method of wireless communication is described. The method may include receiving, at a receiving device, a pre-grant indication of a data transmission from a scheduling device, where the data transmission is via a shared mmW radio frequency spectrum band, performing, responsive to receiving the pre-grant indication, a LBT procedure to determine that the shared mmW radio frequency spectrum band is available for the data transmission, transmitting, based on the shared mmW radio frequency spectrum band being available for the data transmission, a control signal from the receiving device to a transmitting device to trigger a start of the data transmission, and receiving the data transmission triggered by the control signal.

An apparatus for wireless communication is described. The apparatus may include a processor, memory in electronic communication with the processor, and instructions stored in the memory. The instructions may be executable by the processor to cause the apparatus to receive, at a receiving device, a pre-grant indication of a data transmission from a scheduling device, where the data transmission is via a shared mmW radio frequency spectrum band, perform, responsive to receiving the pre-grant indication, a LBT procedure to determine that the shared mmW radio frequency spectrum band is available for the data transmission, transmit, based on the shared mmW radio frequency spectrum band being available for the data transmission, a control signal from the receiving device to a transmitting device to trigger a start of the data transmission, and receive the data transmission triggered by the control signal.

Another apparatus for wireless communication is described. The apparatus may include means for receiving, at a receiving device, a pre-grant indication of a data transmission from a scheduling device, where the data transmission is via a shared mmW radio frequency spectrum band, performing, responsive to receiving the pre-grant indication, a LBT procedure to determine that the shared mmW radio frequency spectrum band is available for the data transmission, transmitting, based on the shared mmW radio frequency spectrum band being available for the data transmission, a control signal from the receiving device to a transmitting device to trigger a start of the data transmission, and receiving the data transmission triggered by the control signal.

A non-transitory computer-readable medium storing code for wireless communication is described. The code may include instructions executable by a processor to receive, at a receiving device, a pre-grant indication of a data transmission from a scheduling device, where the data transmission is via a shared mmW radio frequency spectrum band, perform, responsive to receiving the pre-grant indication, a LBT procedure to determine that the shared mmW radio frequency spectrum band is available for the data transmission, transmit, based on the shared mmW radio frequency spectrum band being available for the data transmission, a control signal from the receiving device to a transmitting device to trigger a start of the data transmission, and receive the data transmission triggered by the control signal.

In some examples of the method, apparatuses, and non-transitory computer-readable medium described herein, the pre-grant indication of the data transmission includes an LBT length parameter, and where a duration of the LBT procedure is based on the LBT length parameter. In some examples of the method, apparatuses, and non-transitory computer-readable medium described herein, the LBT procedure may be a clear channel assessment (CCA) check using energy detection (ED) for a duration of a CCA observation time, where the CCA observation time may be based in part on a random number that is selected for a number of CCA slots to measure channel energy, and where the LBT length parameter includes the random number.

In some examples of the method, apparatuses, and non-transitory computer-readable medium described herein, the data transmission may be a downlink-centric data transmission within a transmission opportunity (TxOP), and where the scheduling device and the transmitting device may be a base station, and the receiving device may be a UE.

In some examples of the method, apparatuses, and non-transitory computer-readable medium described herein, the data transmission may be an uplink-centric data transmission within a TxOP, and where the scheduling device and the receiving device may be the base station and the transmitting device may be the UE.

In some examples of the method, apparatuses, and non-transitory computer-readable medium described herein, the data transmission includes a downlink data portion and an uplink data portion within a TxOP, where the scheduling device may be the base station, and where the base station may be the transmitting device for the downlink portion and the receiving device for the uplink portion, and the UE may be the receiving device for the downlink portion and the transmitting device for the uplink portion.

In some examples of the method, apparatuses, and non-transitory computer-readable medium described herein, the control signal includes a trigger indicator that the shared mmW radio frequency spectrum band is available for the data transmission and padding that provides time for the transmitting device to process the trigger indicator and initiate the data transmission within a time threshold after the control signal. In some examples of the method, apparatuses, and non-transitory computer-readable medium described herein, the pre-grant indication may be a short control signaling transmission that may be exempt from the LBT procedure. In some examples of the method, apparatuses, and non-transitory computer-readable medium described herein, the LBT procedure may be performed based on a beamformed receiving beam that may be to be used for receiving the data transmission.

Some examples of the method, apparatuses, and non-transitory computer-readable medium described herein may further include operations, features, means, or instructions for transmitting from the receiving device, before performing the LBT procedure, an acknowledgment of the pre-grant indication. In some examples of the method, apparatuses, and non-transitory computer-readable medium described herein, the acknowledgment of the pre-grant indication may be transmitted based on the reception of the pre-grant indication and an interference level associated with the pre-grant indication being below a threshold value. In some examples of the method, apparatuses, and non-transitory computer-readable medium described herein, the acknowledgment of the pre-grant indication may be short control signaling that may be exempt from CCA. Some examples of the method, apparatuses, and non-transitory computer-readable medium described herein may further include operations, features, means, or instructions for measuring an interference level during the LBT procedure and transmitting an indication of the interference level with the control signal for setting of a modulation and coding scheme (MCS) of the data transmission.

In some examples of the method, apparatuses, and non-transitory computer-readable medium described herein, the pre-grant indication further indicates a second data transmission from the receiving device to the transmitting device, and where the receiving device prepares the second data transmission responsive to the pre-grant indication, and further may include operations, features, means, or instructions for transmitting the second data transmission responsive to a second trigger received from the transmitting device. In some examples of the method, apparatuses, and non-transitory computer-readable medium described herein, the data transmission may be a first data transmission, and where the pre-grant indication further indicates a second data transmission from the receiving device to the transmitting device to be transmitted after the first data transmission; and may include operations, features, means, or instructions for receiving a second trigger from the transmitting device in the data transmission and transmitting the second data transmission responsive to the second trigger. In some examples of the method, apparatuses, and non-transitory computer-readable medium described herein, the scheduling device may be a component of a base station.

A method of wireless communication is described. The method may include receiving, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitoring for a control signal from the receiving device that indicates the shared mmW radio frequency spectrum band is available for the data transmission, and transmitting, responsive to receiving the control signal, the data transmission via the shared mmW radio frequency spectrum band.

An apparatus for wireless communication is described. The apparatus may include a processor, memory in electronic communication with the processor, and instructions stored in the memory. The instructions may be executable by the processor to cause the apparatus to receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitor for a control signal from the receiving device that indicates the shared mmW radio frequency spectrum band is available for the data transmission, and transmit, responsive to receiving the control signal, the data transmission via the shared mmW radio frequency spectrum band.

Another apparatus for wireless communication is described. The apparatus may include means for receiving, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitoring for a control signal from the receiving device that indicates the shared mmW radio frequency spectrum band is available for the data transmission, and transmitting, responsive to receiving the control signal, the data transmission via the shared mmW radio frequency spectrum band.

A non-transitory computer-readable medium storing code for wireless communication is described. The code may include instructions executable by a processor to receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitor for a control signal from the receiving device that indicates the shared mmW radio frequency spectrum band is available for the data transmission, and transmit, responsive to receiving the control signal, the data transmission via the shared mmW radio frequency spectrum band.

In some examples of the method, apparatuses, and non-transitory computer-readable medium described herein, the pre-grant indication of the data transmission includes an LBT length parameter, and where a duration of the LBT procedure is based on the LBT length parameter. In some examples of the method, apparatuses, and non-transitory computer-readable medium described herein, the LBT procedure may be a CCA check using ED for a duration of a CCA observation time, where the CCA observation time may be based in part on a random number that may be selected for a number of CCA slots to measure channel energy, and where the LBT length parameter includes the random number.

In some examples of the method, apparatuses, and non-transitory computer-readable medium described herein, the data transmission may be a downlink-centric data transmission within a transmission opportunity (TxOP), and where the scheduling device and the transmitting device may be components of a base station, and the receiving device may be a UE.

In some examples of the method, apparatuses, and non-transitory computer-readable medium described herein, the data transmission may be an uplink-centric data transmission within a TxOP, and where the scheduling device and the receiving device may be components of the base station and the transmitting device may be the UE.

In some examples of the method, apparatuses, and non-transitory computer-readable medium described herein, the data transmission includes a downlink data portion and an uplink data portion within a TxOP, where the scheduling device may be a components of the base station, and where the base station may be the transmitting device for the downlink portion and the receiving device for the uplink portion, and the UE may be the receiving device for the downlink portion and the transmitting device for the uplink portion.

In some examples of the method, apparatuses, and non-transitory computer-readable medium described herein, the control signal includes a trigger indicator that the shared mmW radio frequency spectrum band may be available for the data transmission and padding that provides time for the transmitting device to process the trigger indicator and initiate the data transmission within a time threshold after the control signal. In some examples of the method, apparatuses, and non-transitory computer-readable medium described herein, the pre-grant indication may be a short control signaling transmission that may be exempt from the LBT procedure.

Some examples of the method, apparatuses, and non-transitory computer-readable medium described herein may further include operations, features, means, or instructions for receiving, before the monitoring for the control signal, an acknowledgment that the pre-grant indication was received at the receiving device. In some examples of the method, apparatuses, and non-transitory computer-readable medium described herein, the acknowledgment of the pre-grant indication may be transmitted based on an interference level measured during the LBT procedure. In some examples of the method, apparatuses, and non-transitory computer-readable medium described herein, the acknowledgment of the pre-grant indication may be short control signaling that may be exempt from the LBT procedure.

Some examples of the method, apparatuses, and non-transitory computer-readable medium described herein may further include operations, features, means, or instructions for determining an interference during the LBT procedure and selecting an MCS of the data transmission based on the interference measurement.

In some examples of the method, apparatuses, and non-transitory computer-readable medium described herein, the pre-grant indication further indicates a second data transmission from the receiving device to the transmitting device, and may further include operations, features, means, or instructions for performing an LBT procedure to determine that the shared mmW radio frequency spectrum band is available for the second data transmission, transmitting a trigger to the receiving device to initiate transmission of the second data transmission, and receiving the second data transmission.

DETAILED DESCRIPTION

Figure 1:
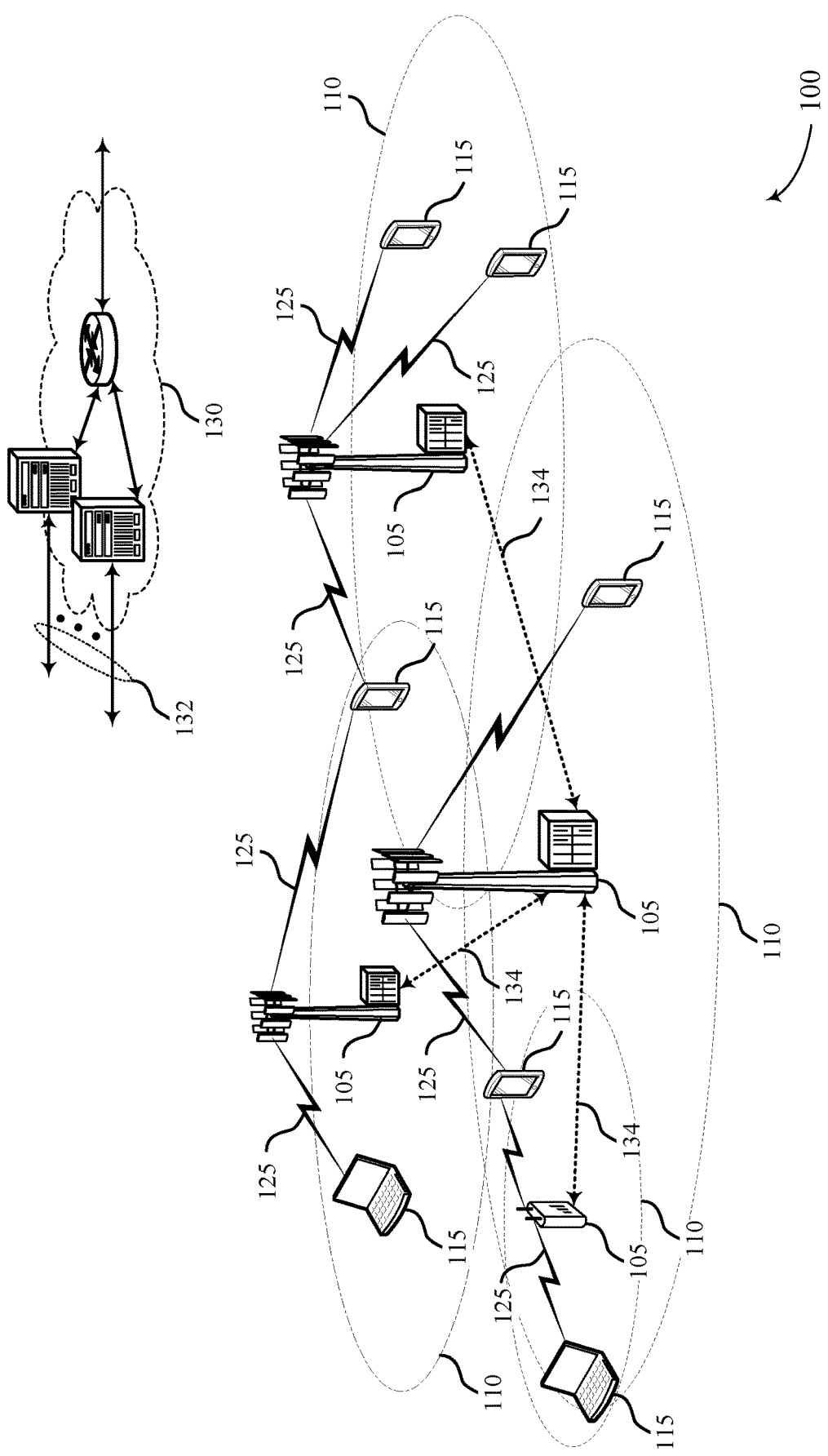
FIG. 1 illustrates an example of a system for wireless communications that supports receiver-based listen before talk techniques in shared millimeter wave radio frequency spectrum in accordance with aspects of the present disclosure.

Various aspects of the present disclosure provide techniques for a receiving device to perform listen-before-talk (LBT) techniques in shared millimeter wave (mmW) radio frequency spectrum. In some cases, scheduling device, such as a scheduler in a base station, may provide a pre-grant indication of a data transmission. The data transmission may be transmitted via a shared mmW radio frequency spectrum band, and a LBT procedure may be performed at a receiving device responsive to the pre-grant indication, to determine that the shared mmW radio frequency spectrum band is available for the data transmission. In some cases, the receiving device may be the base station that is to receive an uplink transmission from a user equipment (UE). In some cases, the receiving device may be the UE that is to receive a downlink transmission from the base station.

An indication may be transmitted to the transmitting device to indicate that the receiving device has successfully performed the LBT procedure, which may act as a trigger for the transmitting device to start the data transmission. In some cases, an acknowledgment of receipt of the pre-grant indication may be provided before the LBT procedure is completed, which may allow the transmitting device to reuse resources of the data transmission if the acknowledgment is not received. The transmitting device may monitor for the trigger, and may start the data transmission via the shared mmW radio frequency spectrum band upon receipt of the trigger. In some cases, the transmitting device may also perform an LBT procedure to confirm that the wireless channel is available for transmitting.

In some cases, the data transmission is a downlink-centric data transmission within a transmission opportunity (TxOP) or channel occupancy time (COT), the scheduling device and the transmitting device are the base station, and the receiving device is the UE. In other cases, the data transmission is an uplink-centric data transmission within a TxOP or COT, the scheduling device and the receiving device are the base station and the transmitting device is the UE. In further cases, the data transmission includes a downlink data portion and an uplink data portion within a TxOP or COT, the scheduling device is the base station, the base station is the transmitting device for the downlink portion and the receiving device for the uplink portion, and the UE is the receiving device for the downlink portion and the transmitting device for the uplink portion.

As indicated, in some cases, shared mmW radio frequency spectrum bands (e.g., 60 GHz frequencies) are used for communications between the UE and the base station, and a LBT procedure may be performed before a transmitter begins transmitting. As indicated above, in some cases such a LBT procedure may be a clear channel assessment (CCA) check using energy detection (ED) for a duration of a CCA observation time. If ED during a CCA is below a threshold value, the channel is available and transmissions may start. Thus, in such cases, a transmitter and receiver may not have knowledge in advance of whether a channel will be available for transmission. Further, in mmW frequencies that use beamforming, a transmitting device may not detect transmissions that may be interfering at a receiving device. In such cases, an LBT procedure at the transmitting device may not reliably indicate that the receiving device will be able to receive the transmission. Techniques that may enable reliable determination of transmissions in shared radio frequency spectrum may thus enhance network efficiency.

For example, in the 60 GHz unlicensed band, some regulations provide rules for channel access, such as that an observation time is determined as 8+n*5 μs, where n=0 . . . 127 and is a random integer number. In such cases, 8 μs is the minimum deferral time and each 5 μs may be referred to as a CCA slot. Using such techniques, a device may monitor a channel for a continuous length of 8+n*5 μs before starting to use the channel. In the event that there is an interruption when the device is counting down, the CCA will restart with a new random number n. In some cases, a device may transmit a response to a received transmission by transmitting immediately after the packet is received without performing a CCA, and such an immediate transmission may start, for example, within 8 μs. Further, regulations may provide that certain transmissions may be CCA-exempt transmissions, such as short control signaling transmissions (e.g., ACK/NACK feedback signals, beacon frames, other time synchronization frames and frames for beamforming, pre-grant transmissions, or trigger transmissions).

While such a LBT procedure may be required prior to a transmitter beginning a transmission in shared radio frequency spectrum, it may not provide mean that the wireless channel is available at the receiving device. For example, the transmitting device may determine that the LBT procedure passed and that the channel is clear, but due to the relatively high attenuation of signals in mmW frequencies, and highly directional nature of beamformed transmissions, an interfering device may be present near the receiving device that is not detected at the transmitting device. Techniques provided herein allow a receiving device to also confirm that the channel is available for transmissions prior to the transmitting device beginning the transmissions. Such techniques may allow more efficient use of wireless resources by reducing transmissions in cases where successful reception is unlikely. In some cases, if the transmitting device does not receive an indication that the LBT passed at the receiving device, the wireless resources for the transmission may be reused for another transmission to a different device.

In some cases, the acknowledgment of the pre-grant indication from the receiving device is transmitted based at least in part on the reception of the pre-grant indication and an interference level associated with the pre-grant indication being below a threshold value. In such cases, the receiving device may measure an interference level during and transmit an indication of the interference level with the control signal, which may be used by the transmitting device for setting of a modulation and coding scheme (MCS) of the data transmission. Such techniques may further enhance efficiency of the network by providing more reliable transmissions between devices.

Aspects of the disclosure are initially described in the context of a wireless communications system. Various examples of uplink and downlink transmissions are then discussed. Aspects of the disclosure are further illustrated by and described with reference to apparatus diagrams, system diagrams, and flowcharts that relate to receiver-based listen before talk techniques in shared millimeter wave radio frequency spectrum.

FIG. 1 illustrates an example of a wireless communications system 100 that supports receiver-based listen before talk techniques in shared millimeter wave radio frequency spectrum in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may transmit using shared mmW radio frequency spectrum in accordance with various techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EAR-FCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., a set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, when using shared radio frequency spectrum, the wireless communications system 100 may utilize LBT procedures at both the transmitter side and the receiver side, to verify that the wireless channel is available at both the transmitter and the receiver. In some cases, a base station 105 may include a scheduling component that schedules communications and allocates resources among UEs 115. The scheduling component may identify wireless resources for a transmission using shared radio frequency spectrum, and may provide a pre-grant indication of the data transmission to the receiving device. The receiving device, which may be a UE 115 or a base station 105, depending upon whether the data transmission is an uplink or downlink transmission, may perform a LBT procedure in a similar manner as a transmitting device before initiating a transmission using the shared radio frequency spectrum. If the LBT passes, the receiving device may provide an indication to the transmitting device (e.g., a control signal that indicates that the LBT has passed), which may act as a trigger for the transmitting device to start the data transmission. In some cases, an acknowledgment of receipt of the pre-grant indication may be provided before the LBT procedure is completed, which may allow the transmitting device to reuse resources of the data transmission if the acknowledgment is not received.

Figure 2:
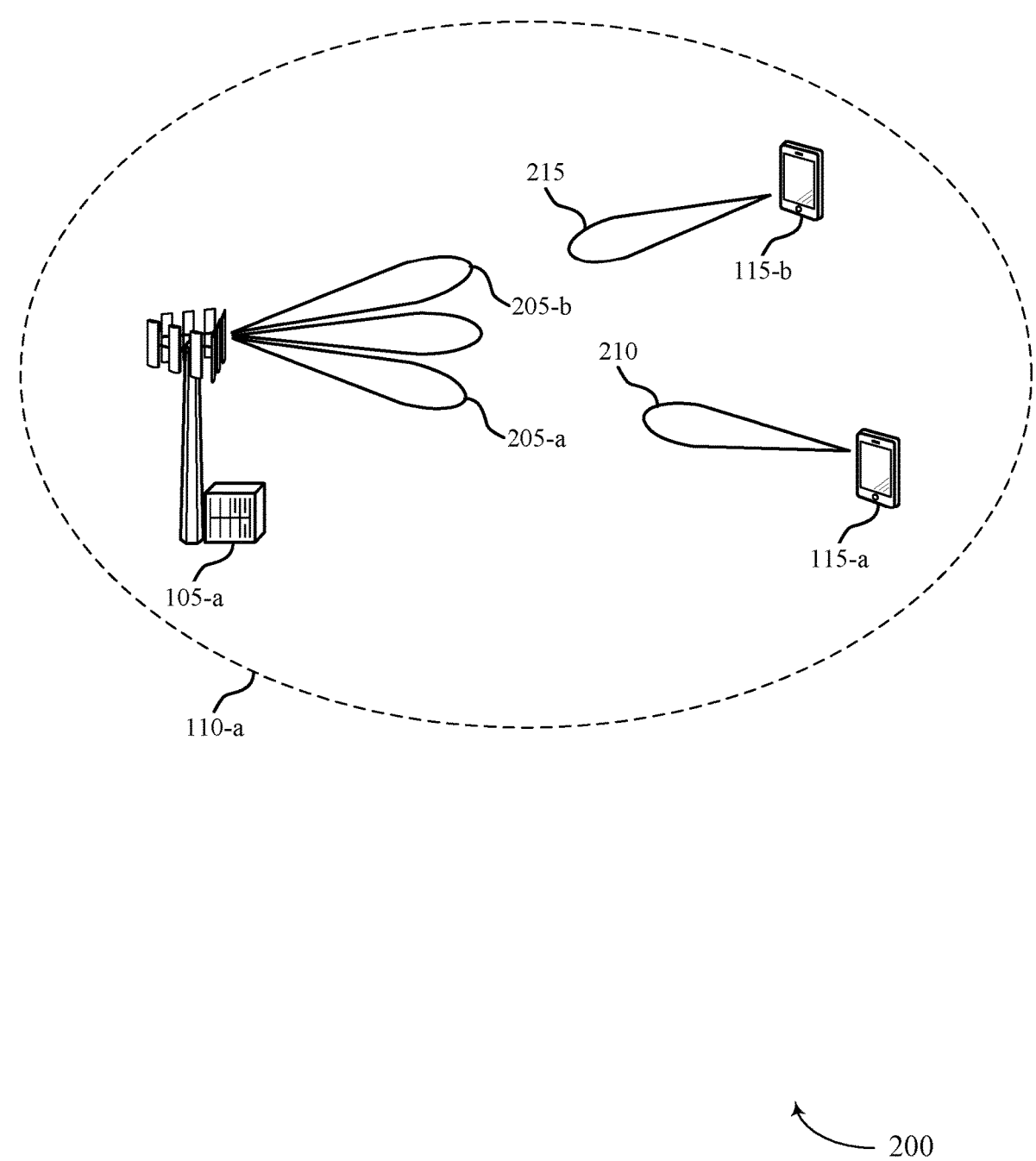
FIG. 2 illustrates an example of a portion of a wireless communications system that supports receiver-based listen before talk techniques in shared millimeter wave radio frequency spectrum in accordance with aspects of the present disclosure.

FIG. 2 illustrates an example of a wireless communications system 200 that supports receiver-based listen before talk techniques in shared millimeter wave radio frequency spectrum in accordance with aspects of the present disclosure. In some examples, wireless communications system 200 may implement aspects of wireless communications system 100. The wireless communications system 200 may include base station 105-a, a first UE 115-a, and a second UE 115-b, which may be examples of a base station 105 and a UE 115, as described with reference to FIG. 1.

Base station 105-a may provide network coverage for geographic area 110-a. Base station 105-a and first UE 115-a may communicate using beamformed or directional transmissions such as via downlink beam 205-a and uplink beam 210. Base station 105-a and second UE 115-b may communicate using beamformed or directional transmissions such as via downlink beam 205-b and uplink beam 215. While various examples provided herein describe beamformed mmW transmissions, techniques discussed herein may be used with non-beamformed transmissions, transmissions at lower frequencies, or both. Thus, the base station 105-a may also use non-beamformed transmissions for communications with one or more UEs 115 which may include first UE 115-a, second UE 115-b, or other UEs. As discussed above, both the base station 105-a and the UEs 115 may perform LBT procedures before transmitting using shared radio frequency spectrum. Further, a scheduler at the base station 105-a may allocate certain resources for transmissions, and various techniques may be provided that allow the base station 105-a and UEs 115 to transmit in accordance with the scheduled resources.

As discussed above, in cases where shared mmW radio frequency spectrum bands (e.g., 60 GHz frequencies) are used for communications, a CCA check may be performed using ED for a duration of a CCA observation time, and if ED during a CCA is below a threshold value, the channel is available and transmissions may start. In some cases, an observation time is determined as $8+n*5$ μs, where n=0 . . . 127 and is a random integer number. In such cases, 8 μs is the minimum deferral time and each 5 μs may be referred to as a CCA slot. Using such techniques, a device may monitor a channel for a continuous length of $8+n*5$ μs before starting to use the channel. In the event that there is an interruption when the device is counting down, the CCA will restart with a new random number n. In some cases, a device may transmit a response to a received transmission by transmitting immediately after the packet is received without performing a CCA, and such an immediate transmission may start, for example, within 8 μs. Further, regulations may provide that certain transmissions may be CCA-exempt transmissions, such as short control signaling transmissions (e.g., ACK/NACK feedback signals, beacon frames, other time synchronization frames and frames for beamforming, pre-grant transmissions, or trigger transmissions).

In some cases, mmW transmissions may use a sub-carrier spacing (SCS) of 960 kHz. In such cases, 8 μs will be about half of a slot according to a 960 kHz SCS and $8+127*5$ will be about 41.2 slots. Thus, the CCA in such cases may range from about half of a slot to up to about 41 slots, which can provide substantial variability on when a receiving device can expect to receive a transmission. For a responding device, only if the transmission can happen within 8 μs of the ending of reception, the CCA can be skipped. Thus, if the first UE 115-a is receiving a downlink transmission from the base station 105-a, a HARQ ACK/NACK feedback transmission may be transmitted within 8 μs of the ending of the downlink transmission and a scheduler at the base station may leave at most a half-slot (7 symbol) gap between the downlink and uplink data bursts. For example, this may be achieved by either a half-slot scheduled at the end of a downlink burst, or a half-slot scheduled at the beginning an uplink burst.

As discussed above, transmitter side CCA may not detect certain cases where a receiver is jammed. For example, if an interfering device is located within close proximity of the first UE 115-a, a transmission from the base station 105-a is unlikely to be successfully received at the first UE 115-a. However, when using beamforming in mmW frequencies, the CCA procedure at the base station 105-a prior to transmission may not detect that the first UE 115-a is being jammed. Various techniques provided herein provide for energy-based LBT procedures (e.g., CCA) at the receiver side, while also complying with regulatory requirements associated with accessing shared radio frequency spectrum.

Figure 3:
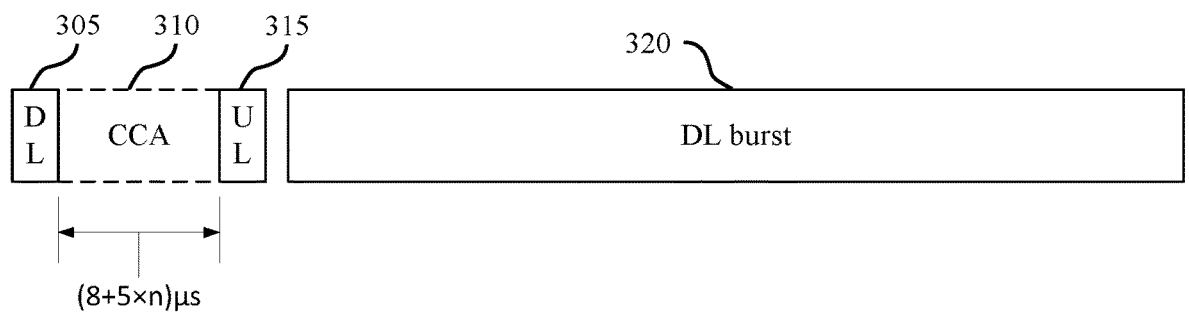
FIG. 3 illustrates an example of a pre-grant indication and trigger that supports receiver-based listen before talk techniques in shared millimeter wave radio frequency spectrum in accordance with aspects of the present disclosure.

FIG. 3 illustrates an example of a pre-grant indication and trigger 300 that supports receiver-based listen before talk techniques in shared millimeter wave radio frequency spectrum in accordance with aspects of the present disclosure. In some examples, pre-grant indication and trigger 300 may implement aspects of wireless communications system 100 or 200. In this example, a CCA may be performed at a UE for a long downlink burst which may be followed by a short uplink burst (e.g., an ACK/NACK transmission).

In the example of FIG. 3, a scheduler at a base station may allocate downlink resources for a downlink burst 320. The base station may transmit an initial downlink transmission 305 that may include a pre-grant indication of the downlink resources. In some cases, the pre-grant indication may be a grant for a scheduled downlink transmission, such as the downlink burst 320. The pre-grant indication may indicate to the UE that the downlink burst 320 is to be transmitted, and may also serve as a CCA trigger, and include a CCA length parameter n. The UE may then perform a CCA 310 according to the CCA length indicated by the pre-grant indication. The base station providing the CCA length may allow the base station and UE to be synchronized when the base station starts transmission of the downlink burst 320. After the CCA is complete, the UE may transmit an uplink control signal 315 to trigger the base station to transmit the actual downlink burst 320. The base station may detect the uplink control signal 315 and transmit the downlink burst 320 responsive thereto. In some cases, a short uplink burst (e.g., ACK/NACK feedback) may follow the downlink burst 320. In some cases such a short uplink burst may be transmitted within the time limit (e.g., 8 μs) or may be transmitted after the time limit as a short control transmission without a CCA.

The timing of the uplink control signal 315 may be known by the base station, as it is determined by the CCA length and the generated value of n provided by the base station. In some cases, the downlink burst 320 may be prepared ahead of time, so the processing gap between the uplink control signal 315 and the downlink burst 320 is only the uplink control processing time. In cases where there is a limit on the gap between the uplink control signal 315 and the start of the downlink burst 320 (e.g., an 8 μs limit), the downlink burst 320 may need a separate CCA that is performed by the base station. In some cases, to avoid the need for the base station to perform a separate CCA, the uplink control signal 315 may include some padding that may allow the base station to process the signal and start the downlink burst 320 within the time limit for doing so.

In some cases, the pre-grant transmission of the initial downlink transmission 305 may be considered as short control signaling, and may be transmitted without a CCA and is not considered part of the TxOP of the downlink burst 320. In such cases, the uplink control signal 315 may be considered as the starting of TxOP (or channel occupancy time (COT)). In the event that the CCA fails at the UE, the uplink control signal 315 will not be transmitted, and the base station may reuse the wireless resources allocated for the downlink burst 320 to serve one or more other UEs in possibly another beam. In some cases, the UE CCA may use narrow beam, pointing to the base station that may match a transmission beam that is used by the base station for the downlink burst 320 transmission.

Figure 4:
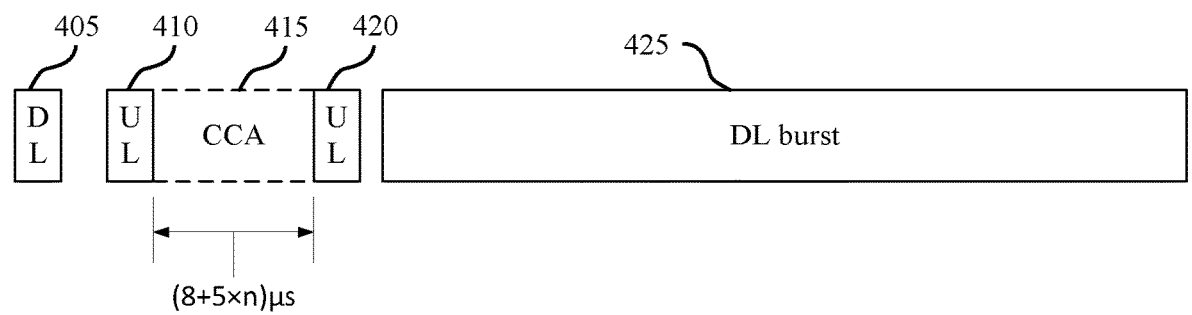
FIG. 4 illustrates an example of a pre-grant indication, acknowledgment, and trigger that supports receiver-based listen before talk techniques in shared millimeter wave radio frequency spectrum in accordance with aspects of the present disclosure.

FIG. 4 illustrates an example of a pre-grant indication, acknowledgment, and trigger 400 that supports receiver-based listen before talk techniques in shared millimeter wave radio frequency spectrum in accordance with aspects of the present disclosure. In some examples, pre-grant indication, acknowledgment, and trigger 400 may implement aspects of wireless communications system 100 or 200. In this example, similarly as in the example of FIG. 3, a CCA may be performed at a UE for a long downlink burst which may be followed by a short uplink burst (e.g., an ACK/NACK transmission).

In the example of FIG. 4, a scheduler at a base station may allocate downlink resources for a downlink burst 425. The base station may transmit an initial downlink transmission 405 that may include a pre-grant indication of the downlink resources. The pre-grant indication may indicate to the UE that the downlink burst 425 is to be transmitted, and may also serve as a CCA trigger, and include a CCA length parameter n. In this example, the UE may transmit an acknowledgment uplink transmission 410 that acknowledges the initial downlink transmission 405.

The UE may then perform a CCA 415 according to the CCA length indicated by the pre-grant indication. The base station providing the CCA length may allow the base station and UE to be synchronized when the base station starts transmission of the downlink burst 425. After the CCA is complete, the UE may transmit an uplink control signal 420 to trigger the base station to transmit the actual downlink burst 425. The base station may detect the uplink control signal 420 and transmit the downlink burst 425 responsive thereto. In some cases, a short uplink burst (e.g., ACK/NACK feedback) may follow the downlink burst 425.

Such a technique may allow earlier detection at the base station if the UE did not receive the initial downlink transmission 405 with the downlink pre-grant, than if the base station only detects the problem after not detecting the uplink control signal 420. Such an occurrence may happen if the UE is being jammed. In some cases, UE may also refrain from sending the acknowledgment uplink transmission 410 even if the initial downlink transmission 405 is received, if an interference level measured at the time exceeds the CCA ED threshold. In such a case, even if the UE performs CCA, the CCA will fail, and thus it can be avoided. If the base station does not detect the acknowledgment uplink transmission 410, the base station may assume the UE is being jammed, and can give up this UE for now and start serving another UE in a different beam without having to wait for the duration of the CCA 415.

Figure 5:
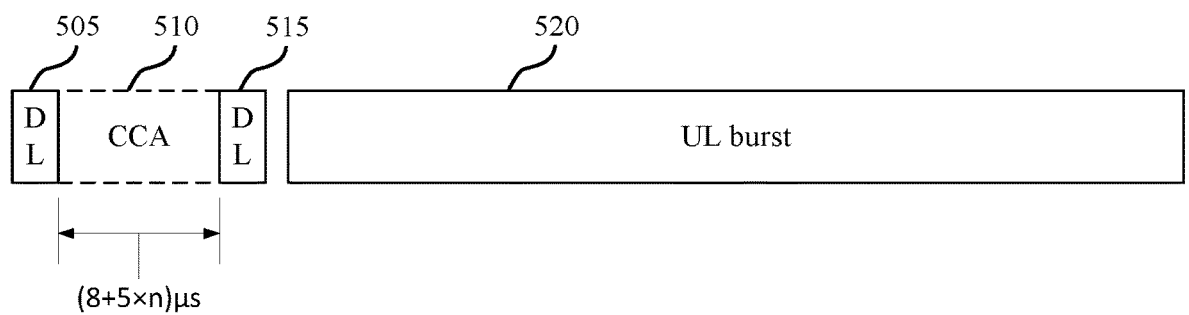
FIG. 5 illustrates an example of a pre-grant indication, and trigger that supports receiver-based listen before talk techniques in shared millimeter wave radio frequency spectrum in accordance with aspects of the present disclosure.

FIG. 5 illustrates an example of a pre-grant indication, and trigger 500 that supports receiver-based listen before talk techniques in shared millimeter wave radio frequency spectrum in accordance with aspects of the present disclosure. In some examples, pre-grant indication, and trigger 500 may implement aspects of wireless communications system 100 or 200. In this example, a CCA may be performed at a base station for a long uplink burst which may be followed by a short downlink burst (e.g., an ACK/NACK transmission).

In the example of FIG. 5, a scheduler at a base station may allocate uplink resources for a uplink burst 520. The base station may transmit an initial downlink transmission 505 that may include a pre-grant indication of the uplink resources. The pre-grant indication may indicate to the UE that the uplink burst 520 is to be transmitted, and may also serve as a trigger for the UE to start preparing the uplink burst 520. The initial downlink transmission may also provide the UE with an indication of the CCA duration (e.g., based on a value of n).

The base station may then perform a CCA 510 according to the CCA length indicated by the pre-grant indication. The base station providing the CCA length may allow the base station and UE to be synchronized when the base station transmits a downlink trigger 515 to tell the UE to transmit the uplink burst 520. In some cases, a short downlink burst (e.g., ACK/NACK feedback) may follow the uplink burst 520. In some cases, the uplink burst 520 may be prepared ahead of time, so the processing gap between the downlink trigger 515 and the uplink burst 520 is only the control processing time. In cases where there is a limit on the gap between the downlink trigger 515 and the start of the uplink burst 520 (e.g., an 8 μs limit), the uplink burst 520 may need a separate CCA that is performed by the UE. In some cases, to avoid the need for the UE to perform a separate CCA, the downlink trigger 515 may include some padding that may allow the UE to process the signal and start the uplink burst 520 within the time limit for doing so.

Similarly as discussed above, the initial downlink transmission 505 may be considered as short control signaling, and is not part of the TxOP or COT, and no CCA is needed prior to the transmission. Additionally, the downlink trigger 515 may be considered as the starting of TxOP or COT. If the CCA 510 fails at the base station, the downlink trigger 515 will not be transmitted, and the base station can serve other UEs in possibly another beam. In some cases, the base station may start serving another UE in a different beam within the CCA 510 as soon as the CCA fails within the CCA duration. In some cases, the CCA 510 may be performed using a narrow beam that corresponds to a transmission beam that the UE will use for the transmission of the uplink burst 520.

Figure 6:
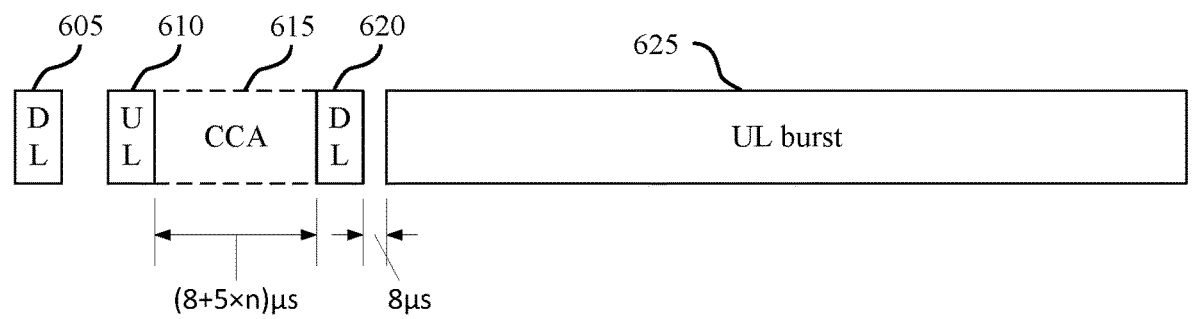
FIG. 6 illustrates an example of a pre-grant indication, acknowledgment, and trigger that supports receiver-based listen before talk techniques in shared millimeter wave radio frequency spectrum in accordance with aspects of the present disclosure.

FIG. 6 illustrates an example of a pre-grant indication, acknowledgment, and trigger 600 that supports receiver-based listen before talk techniques in shared millimeter wave radio frequency spectrum in accordance with aspects of the present disclosure. In some examples, pre-grant indication, acknowledgment, and trigger 600 may implement aspects of wireless communications system 100 or 200. In this example, a CCA may be performed at a base station for a long uplink burst which may be followed by a short downlink burst (e.g., an ACK/NACK transmission).

In the example of FIG. 6, similarly as discussed with respect to FIG. 5, a scheduler at a base station may allocate uplink resources for a uplink burst 625. The base station may transmit an initial downlink transmission 605 that may include a pre-grant indication of the uplink resources. The pre-grant indication may indicate to the UE that the uplink burst 625 is to be transmitted, and may also serve as a trigger for the UE to start preparing the uplink burst 625. The initial downlink transmission may also provide the UE with an indication of the CCA duration (e.g., based on a value of n).

The UE may then transmit uplink acknowledgment 610. Such an acknowledgment may allow the base station to identify that the UE did not receive the initial downlink transmission 605 earlier than at the start of the uplink burst 625. The base station may then perform a CCA 615 according to the CCA length indicated by the pre-grant indication. The base station providing the CCA length may allow the base station and UE to be synchronized when the base station transmits a downlink trigger 620 to tell the UE to transmit the uplink burst 625. In some cases, a short downlink burst (e.g., ACK/NACK feedback) may follow the uplink burst 625. In some cases, the uplink burst 625 may be prepared ahead of time, so the processing gap between the downlink trigger 620 and the uplink burst 625 is only the control processing time. In cases where there is a limit on the gap between the downlink trigger 620 and the start of the uplink burst 625 (e.g., an 8 µs limit), the uplink burst 625 may need a separate CCA that is performed by the UE. In some cases, to avoid the need for the UE to perform a separate CCA, the downlink trigger 620 may include some padding that may allow the UE to process the signal and start the uplink burst 625 within the time limit for doing so.

By providing the uplink acknowledgment 610 the UE allows the base station to know that the UE will prepare the uplink burst 625. If the uplink acknowledgment 610 is not detected, the base station may assume the UE is being jammed, and can give up the UE and start serving another UE in a different beam without having to attempt to receive the uplink burst 625 and fail. In such cases, the initial downlink transmission 605 and uplink acknowledgment 610 may be considered as short control signaling, and not part of the TxOP or COT, and thus no CCA is needed.

Figure 7:
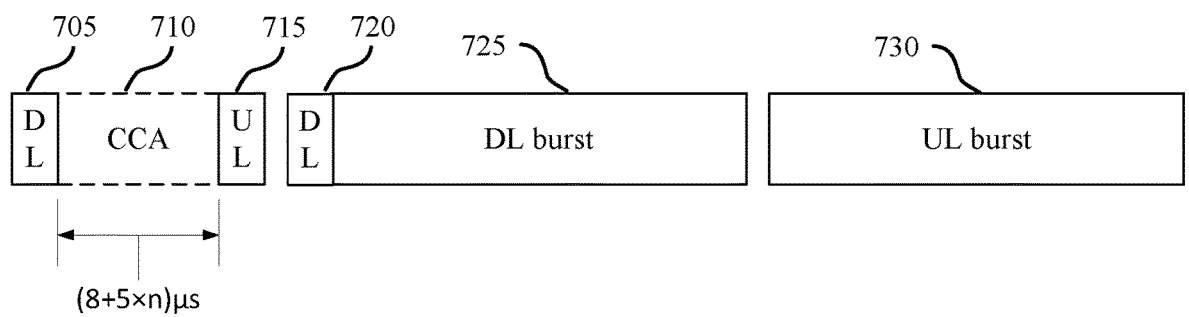
FIG. 7 illustrates an example of a pre-grant indication and trigger for uplink and downlink transmissions that supports receiver-based listen before talk techniques in shared millimeter wave radio frequency spectrum in accordance with aspects of the present disclosure.

FIG. 7 illustrates an example of a pre-grant indication and trigger for uplink and downlink transmissions 700 that supports receiver-based listen before talk techniques in shared millimeter wave radio frequency spectrum in accordance with aspects of the present disclosure. In some examples, pre-grant indication and trigger for uplink and downlink transmissions 700 may implement aspects of wireless communications system 100 or 200. In this example, a CCA may be performed at a UE for a long downlink burst 725 followed by a long uplink burst 730 (which may be followed by a short downlink ACK/NACK burst).

In the example of FIG. 7, a scheduler at a base station may allocate downlink resources for downlink burst 725 as well as uplink resources for an uplink burst 730. In this case, both the base station and the UE are receivers at different times. The base station may transmit an initial downlink transmission 705 that may include a pre-grant indication of the downlink and uplink resources. The pre-grant indication may indicate to the UE that the downlink burst 725 is to be transmitted, and may also serve as a trigger for the UE to start preparing the uplink burst 730. The initial downlink transmission may also provide the UE with an indication of the CCA duration (e.g., based on a value of n).

Both the UE and the base station may then perform a CCA 710 according to the CCA length indicated by the pre-grant indication. The base station providing the CCA length may allow the base station and UE to be synchronized when the UE transmits uplink trigger 715 to tell the base station to transmit the downlink burst 725. In the CCA at the UE passes, the UE may transmit uplink trigger 715. The base station may monitor and detect the uplink trigger 715, and if the CCA passes at the base station, the base station may transmit a downlink trigger 720, which may be transmitted together with downlink burst 725. The UE may detect the downlink trigger 725 to send the uplink burst 730.

Similarly as discussed above, The initial downlink transmission 708 may be considered as short control signaling that is not part of the TxOP or COT, and that does not require CCA. The uplink trigger 715 may be considered as the starting of the TxOP or COT. If the CCA 710 fails at the UE, the uplink trigger will not be transmitted, and the base station can serve other UEs in possibly another beam. If the CCA 710 fails at the base station, the base station will not send the downlink trigger 720 and the uplink burst 730 will not be transmitted. In some cases, the UE CCA may be performed using a narrow beam corresponding to the downlink transmit beam used to transmit the downlink burst 725, and the base station CCA may use a narrow beam corresponding to the uplink transmit beam used to transmit the uplink burst 730.

Figure 8:
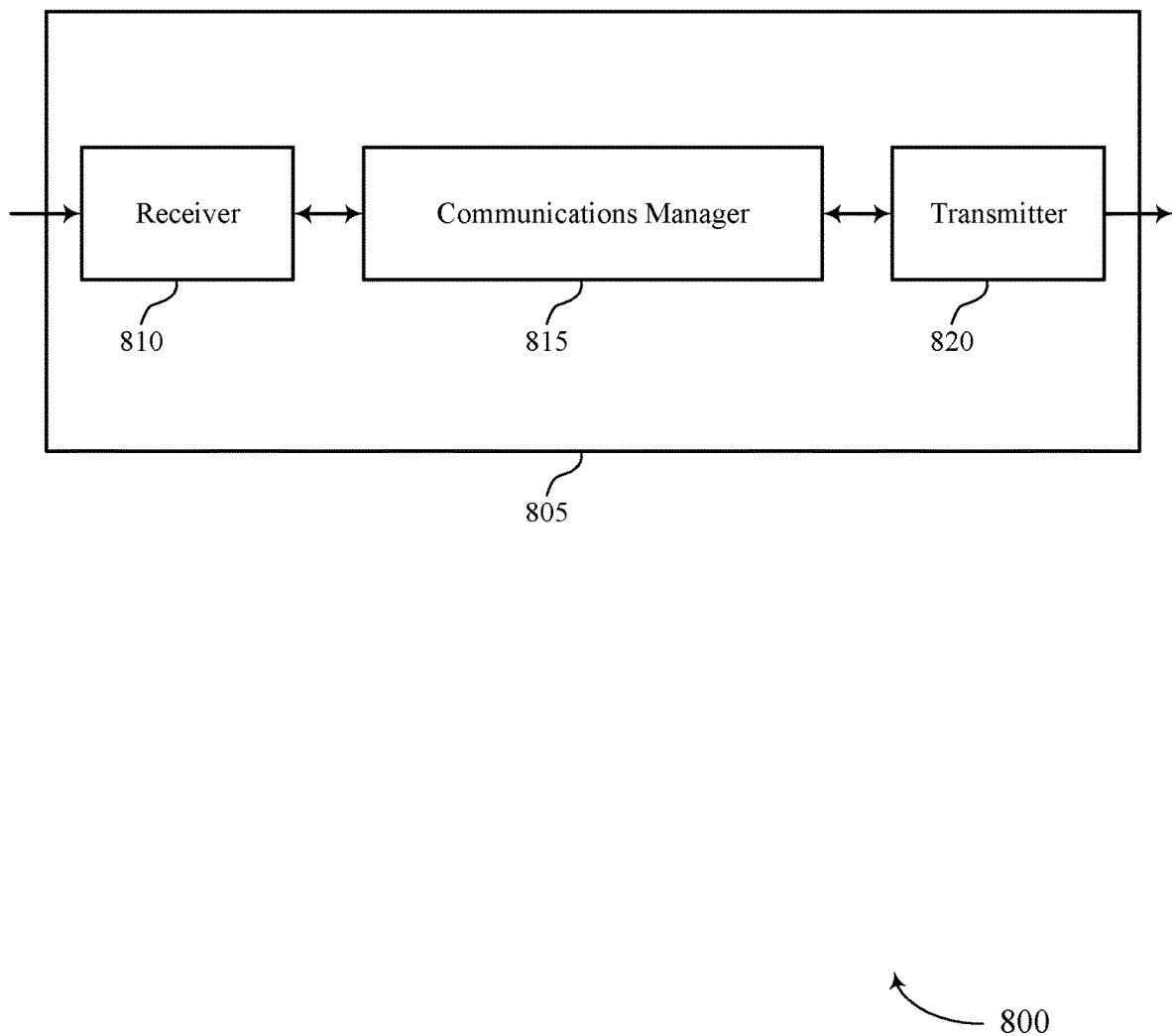
FIGS. 8 and 9 show block diagrams of devices that support receiver-based listen before talk techniques in shared millimeter wave radio frequency spectrum in accordance with aspects of the present disclosure.

FIG. 8 shows a block diagram 800 of a device 805 that supports receiver-based listen before talk techniques in shared millimeter wave radio frequency spectrum in accordance with aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to receiver-based listen before talk techniques in shared millimeter wave radio frequency spectrum, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may receive, at a receiving device, a pre-grant indication of a data transmission from a scheduling device, where the data transmission is via a shared mmW radio frequency spectrum band, perform, responsive to receiving the pre-grant indication, a LBT procedure to determine that the shared mmW radio frequency spectrum band is available for the data transmission, transmit, based on the shared mmW radio frequency spectrum band being available for the data transmission, a control signal from the receiving device to a transmitting device to trigger a start of the data transmission, and receive the data transmission triggered by the control signal.

The communications manager 815 may also receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitor for a control signal from the receiving device that indicates the shared mmW radio frequency spectrum band is available for the data transmission, and transmit, responsive to receiving the control signal, the data transmission via the shared mmW radio frequency spectrum band. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
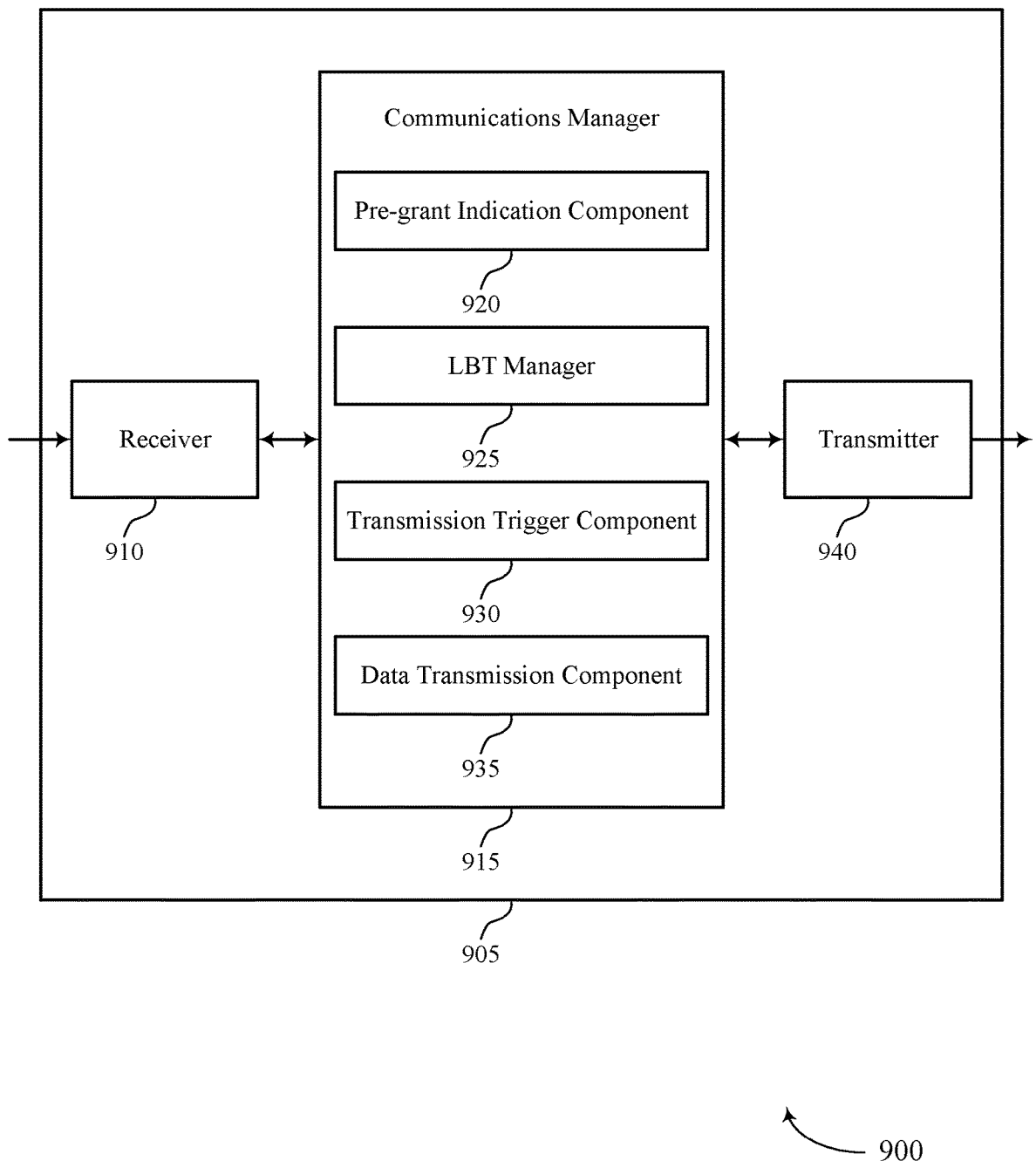

FIG. 9 shows a block diagram 900 of a device 905 that supports receiver-based listen before talk techniques in shared millimeter wave radio frequency spectrum in accordance with aspects of the present disclosure. The device 905 may be an example of aspects of a device 805, a UE 115, or a base station 105 as described herein. The device 905 may include a receiver 910, a communications manager 915, and a transmitter 940. The device 905 may also include a processor. Each of these components may be in communication with one another (e.g., via one or more buses).

Receiver 910 may receive information such as packets, user data, or control information associated with various information channels (e.g., control channels, data channels, and information related to receiver-based listen before talk techniques in shared millimeter wave radio frequency spectrum, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a pre-grant indication component 920, a LBT manager 925, a transmission trigger component 930, and a data transmission component 935. The communications manager 915 may be an example of aspects of the communications manager 1110 or 1210 as described herein.

The pre-grant indication component 920 may receive, at a receiving device, a pre-grant indication of a data transmission from a scheduling device, where the data transmission is via a shared mmW radio frequency spectrum band. In some cases, The pre-grant indication component 920 may receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission.

The LBT manager 925 may perform, responsive to receiving the pre-grant indication, a LBT procedure to determine that the shared mmW radio frequency spectrum band is available for the data transmission.

The transmission trigger component 930, when part of the receiving device, may transmit, based on the shared mmW radio frequency spectrum band being available for the data transmission, a control signal from the receiving device to a transmitting device to trigger a start of the data transmission. In some cases, when part of the transmitting device, the transmission trigger component 930 may monitor for a control signal from the receiving device that indicates the shared mmW radio frequency spectrum band is available for the data transmission.

The data transmission component 935, when part of the receiving device, may receive the data transmission triggered by the control signal. The data transmission component 935, when part of the transmitting device, may transmit, responsive to receiving the control signal, the data transmission via the shared mmW radio frequency spectrum band.

Transmitter 940 may transmit signals generated by other components of the device 905. In some examples, the transmitter 940 may be collocated with a receiver 910 in a transceiver module. For example, the transmitter 940 may be an example of aspects of the transceiver 1120 or 1220 as described with reference to FIGS. 11 and 12. The transmitter 940 may utilize a single antenna or a set of antennas.

Figure 10:
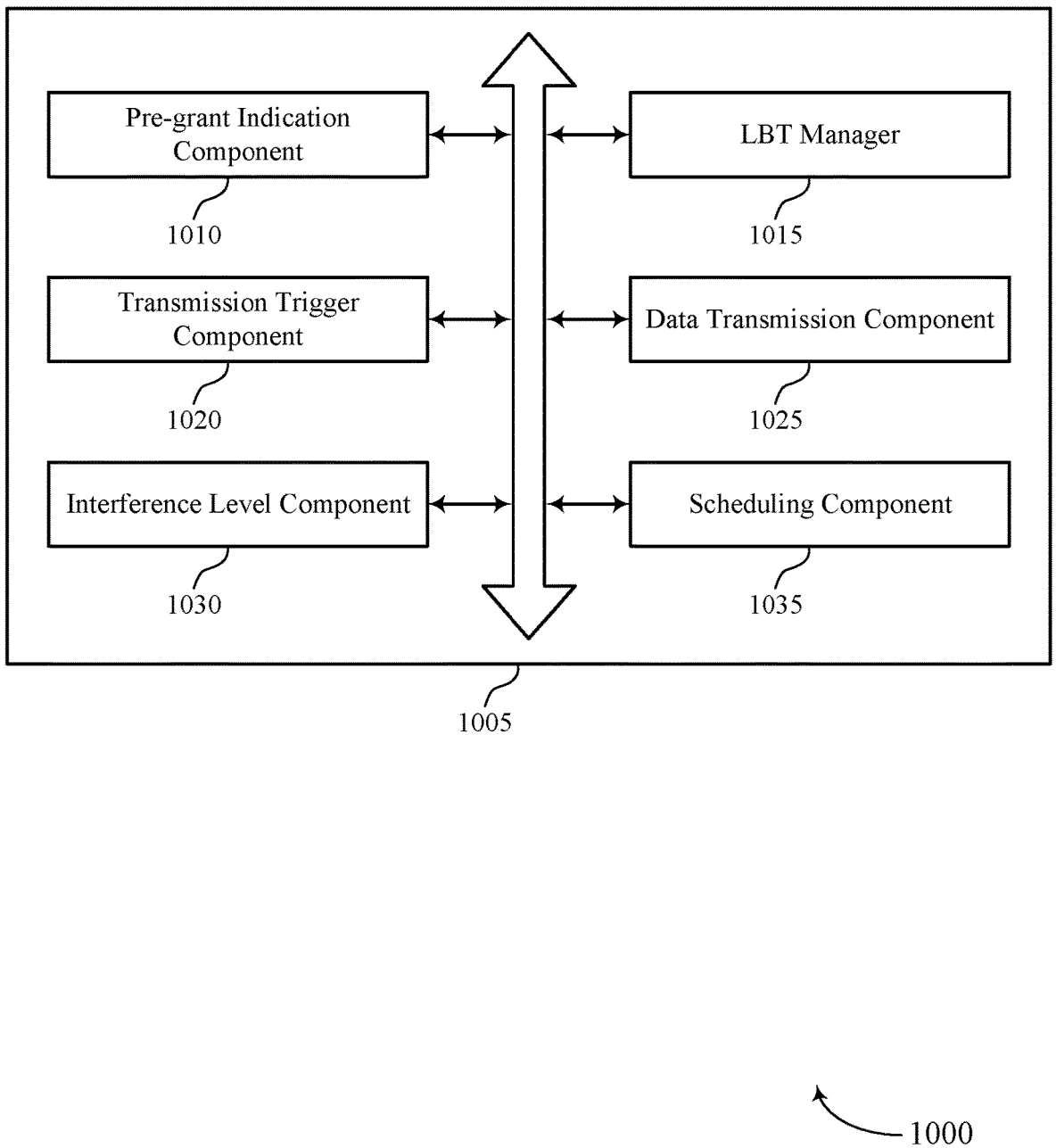
FIG. 10 shows a block diagram of a communications manager that supports receiver-based listen before talk techniques in shared millimeter wave radio frequency spectrum in accordance with aspects of the present disclosure.

FIG. 10 shows a block diagram 1000 of a communications manager 1005 that supports receiver-based listen before talk techniques in shared millimeter wave radio frequency spectrum in accordance with aspects of the present disclosure. The communications manager 1005 may be an example of aspects of a communications manager 815, a communications manager 915, or a communications manager 1110 described herein. The communications manager 1005 may include a pre-grant indication component 1010, a LBT manager 1015, a transmission trigger component 1020, a data transmission component 1025, an interference level component 1030, and a scheduling component 1035. Each of these modules may communicate, directly or indirectly, with one another (e.g., via one or more buses).

The pre-grant indication component 1010 may receive, at a receiving device, a pre-grant indication of a data transmission from a scheduling device, where the data transmission is via mmW radio frequency spectrum band. In some examples, the pre-grant indication component 1010 may receive, from a scheduling device, an indication of wireless resources for a data transmission between a transmitting device and a receiving device via a shared mmW radio frequency spectrum band, and a pre-grant indication of the data transmission, where the receiving device is to perform a LBT procedure prior to the data transmission. In some examples, the pre-grant indication component 1010 may be part of the receiving device and may transmit, before performing the LBT procedure, an acknowledgment of the pre-grant indication.

In some examples, the pre-grant indication component 1010 may receive an acknowledgment that the pre-grant indication was received at the receiving device. In some cases, the pre-grant indication of the data transmission includes an LBT length parameter, and where a duration of the LBT procedure is based on the LBT length parameter. In some cases, the pre-grant indication is a short control signaling transmission that is exempt from the LBT procedure.

The LBT manager 1015 may be part of the receiving device and may perform, responsive to receiving the pre-grant indication, a LBT procedure to determine that the shared mmW radio frequency spectrum band is available for the data transmission. In some cases, the LBT procedure is a CCA check using ED for a duration of a CCA observation time, where the CCA observation time is based in part on a random number that is selected for a number of CCA slots to measure channel energy, and where the LBT length parameter includes the random number. In some cases, the LBT procedure is performed based on a beamformed receiving beam that is to be used for receiving the data transmission. In some cases, the pre-grant indication of the data transmission includes an LBT length parameter, and where a duration of the LBT procedure is based on the LBT length parameter.

The transmission trigger component 1020 may transmit, based on the shared mmW radio frequency spectrum band being available for the data transmission, a control signal from the receiving device to a transmitting device to trigger a start of the data transmission.

In some examples, the transmission trigger component 1020 may be part of the transmitting device, and may monitor for a control signal from the receiving device that indicates the shared mmW radio frequency spectrum band is available for the data transmission. In some examples, the transmission trigger component 1020 may receive a second trigger from the transmitting device in the data transmission. In some cases, the control signal includes a trigger indicator that the shared mmW radio frequency spectrum band is available for the data transmission and padding that provides time for the transmitting device to process the trigger indicator and initiate the data transmission within a time threshold after the control signal.

The data transmission component 1025, when part of the receiving device, may receive the data transmission triggered by the control signal. In some examples, the data transmission component 1025 may be part of the transmitting device, and may transmit, responsive to receiving the control signal, the data transmission via the shared mmW radio frequency spectrum band. In some examples, the data transmission component 1025 may transmit a second data transmission responsive to a second trigger received from the transmitting device. In some examples, the data transmission component 1025 may transmit the second data transmission responsive to the second trigger.

In some cases, the data transmission is a downlink-centric data transmission within a transmission opportunity (TxOP), and where the scheduling device and the transmitting device are a base station, and the receiving device is a UE. In some cases, the data transmission is an uplink-centric data transmission within a TxOP, and where the scheduling device and the receiving device are the base station and the transmitting device is the UE. In some cases, the data transmission includes a downlink data portion and an uplink data portion within a TxOP, where the scheduling device is the base station, and where the base station is the transmitting device for the downlink portion and the receiving device for the uplink portion, and the UE is the receiving device for the downlink portion and the transmitting device for the uplink portion.

The interference level component 1030 may measure an interference level during the LBT procedure. In some examples, the interference level component 1030 may transmit an indication of the interference level with the control signal for setting of an MCS of the data transmission. In some cases, the acknowledgment of the pre-grant indication is transmitted based on the reception of the pre-grant indication and an interference level associated with the pre-grant indication being below a threshold value.

The scheduling component 1035 may schedule uplink and downlink burst transmissions, and may allocate resources for uplink and downlink burst transmissions In some cases, the scheduling component may be part of a base station. In some cases, the scheduling component may be a scheduler process that is executed by a base station.

Figure 11:
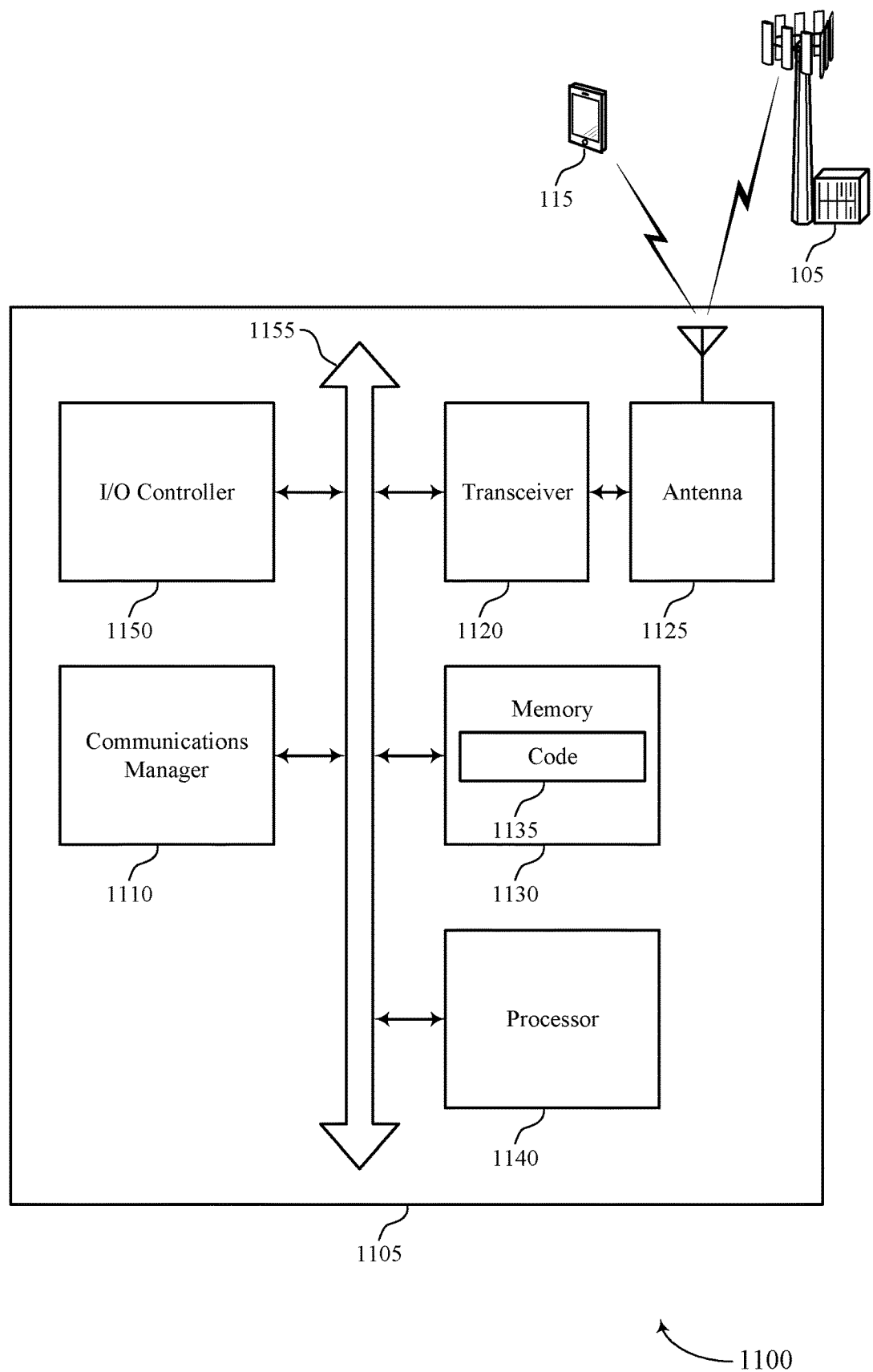
FIG. 11 shows a diagram of a system including a user equipment (UE) that supports receiver-based listen before talk techniques in shared millimeter wave radio frequency spectrum in accordance with aspects of the present disclosure.

FIG. 11 shows a diagram of a system 1100 including a device 1105 that supports receiver-based listen before talk techniques in shared millimeter wave radio frequency spectrum in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may receive, at a receiving device, a pre-grant indication of a data transmission from a scheduling device, where the data transmission is via a shared mmW radio frequency spectrum band, perform, responsive to receiving the pre-grant indication, a LBT procedure to determine that the shared mmW radio frequency spectrum band is available for the data transmission, transmit, based on the shared mmW radio frequency spectrum band being available for the data transmission, a control signal from the receiving device to a transmitting device to trigger a start of the data transmission, and receive the data transmission triggered by the control signal.

The communications manager 1110 may also receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitor for a control signal from the receiving device that indicates the shared mmW radio frequency spectrum band is available for the data transmission, and transmit, responsive to receiving the control signal, the data transmission via the shared mmW radio frequency spectrum band.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting receiver-based listen before talk techniques in shared millimeter wave radio frequency spectrum).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
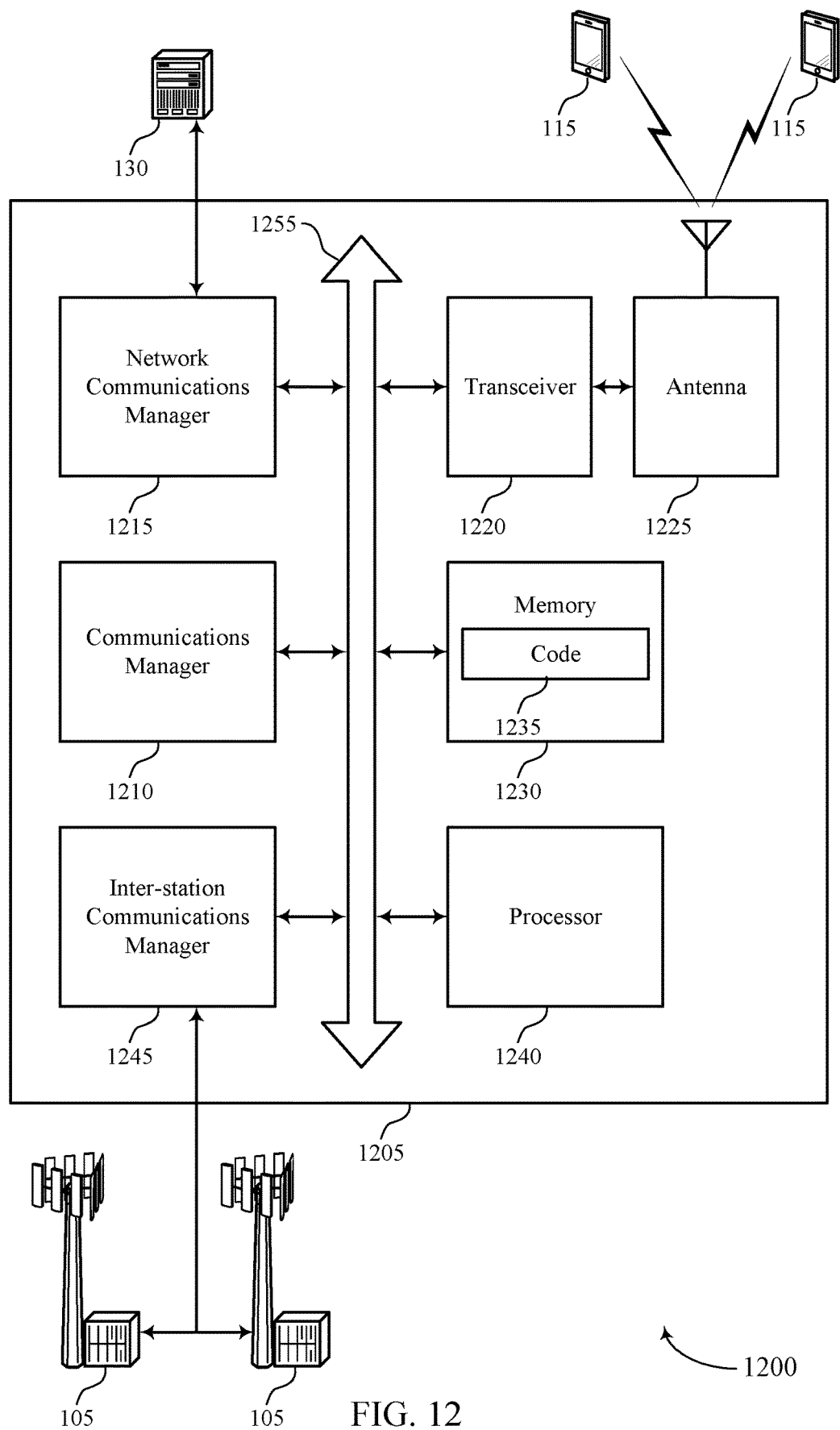
FIG. 12 shows a diagram of a system including a base station that supports receiver-based listen before talk techniques in shared millimeter wave radio frequency spectrum in accordance with aspects of the present disclosure.

FIG. 12 shows a diagram of a system 1200 including a device 1205 that supports receiver-based listen before talk techniques in shared millimeter wave radio frequency spectrum in accordance with aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may receive, at a receiving device, a pre-grant indication of a data transmission from a scheduling device, where the data transmission is via a shared mmW radio frequency spectrum band, perform, responsive to receiving the pre-grant indication, a LBT procedure to determine that the shared mmW radio frequency spectrum band is available for the data transmission, transmit, based on the shared mmW radio frequency spectrum band being available for the data transmission, a control signal from the receiving device to a transmitting device to trigger a start of the data transmission, and receive the data transmission triggered by the control signal.

The communications manager 1210 may also receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission, monitor for a control signal from the receiving device that indicates the shared mmW radio frequency spectrum band is available for the data transmission, and transmit, responsive to receiving the control signal, the data transmission via the shared mmW radio frequency spectrum band.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting receiver-based listen before talk techniques in shared millimeter wave radio frequency spectrum).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
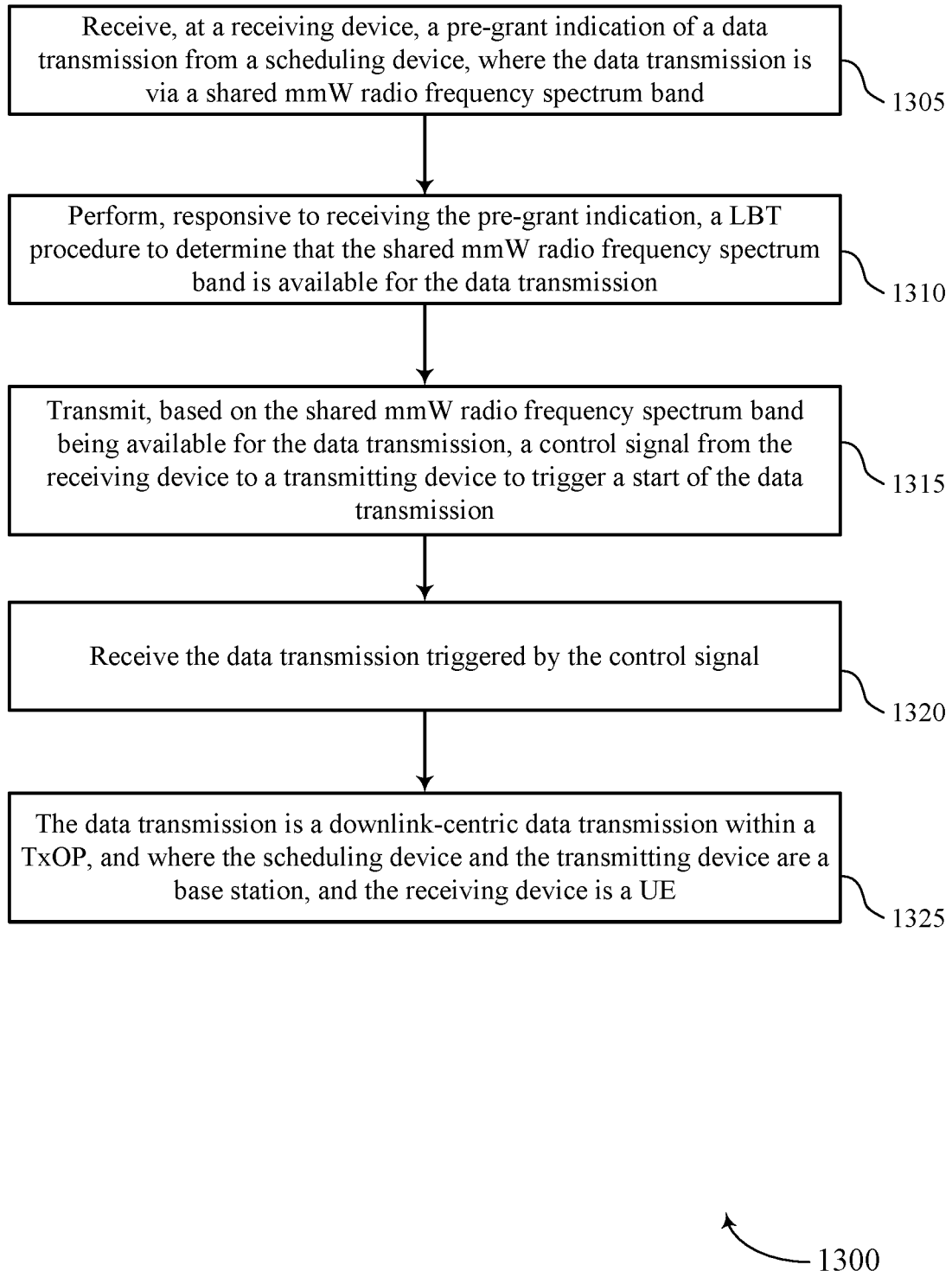
FIGS. 13 through 18 show flowcharts illustrating methods that support receiver-based listen before talk techniques in shared millimeter wave radio frequency spectrum in accordance with aspects of the present disclosure.

FIG. 13 shows a flowchart illustrating a method 1300 that supports receiver-based listen before talk techniques in shared millimeter wave radio frequency spectrum in accordance with aspects of the present disclosure. The operations of method 1300 may be implemented by a UE 115 or base station 105 or its components as described herein. For example, the operations of method 1300 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may receive, at a receiving device, a pre-grant indication of a data transmission from a scheduling device, where the data transmission is via a shared mmW radio frequency spectrum band. The operations of 1305 may be performed according to the methods described herein. In some examples, aspects of the operations of 1305 may be performed by a pre-grant indication component as described with reference to FIGS. 8 through 12. In some cases, the pre-grant indication of the data transmission includes an LBT length parameter, and where a duration of the LBT procedure is based on the LBT length parameter. The operations of 1310 may be performed according to the methods described herein. In some examples, aspects of the operations of 1310 may be performed by a pre-grant indication component as described with reference to FIGS. 8 through 12.

At 1310, the UE or base station may perform, responsive to receiving the pre-grant indication, a LBT procedure to determine that the shared mmW radio frequency spectrum band is available for the data transmission. The operations of 1310 may be performed according to the methods described herein. In some examples, aspects of the operations of 1310 may be performed by a LBT manager as described with reference to FIGS. 8 through 12. In some cases, the LBT procedure is a CCA check using ED for a duration of a CCA observation time, where the CCA observation time is based in part on a random number that is selected for a number of CCA slots to measure channel energy, and where the LBT length parameter includes the random number.

At 1315, the UE or base station may transmit, based on the shared mmW radio frequency spectrum band being available for the data transmission, a control signal from the receiving device to a transmitting device to trigger a start of the data transmission. The operations of 1315 may be performed according to the methods described herein. In some examples, aspects of the operations of 1315 may be performed by a transmission trigger component as described with reference to FIGS. 8 through 12.

At 1320, the UE or base station may receive the data transmission triggered by the control signal. The operations of 1320 may be performed according to the methods described herein. In some examples, aspects of the operations of 1320 may be performed by a data transmission component as described with reference to FIGS. 8 through 12.

At 1325, the UE or base station may the data transmission is a downlink-centric data transmission within a transmission opportunity (TxOP), and where the scheduling device and the transmitting device are a base station, and the receiving device is a UE. The operations of 1325 may be performed according to the methods described herein. In some examples, aspects of the operations of 1325 may be performed by a data transmission component as described with reference to FIGS. 8 through 12. In some cases, the data transmission is an uplink-centric data transmission within a TxOP, and where the scheduling device and the receiving device are the base station and the transmitting device is the UE. In some cases, the data transmission includes a downlink data portion and an uplink data portion within a TxOP, where the scheduling device is the base station, and where the base station is the transmitting device for the downlink portion and the receiving device for the uplink portion, and the UE is the receiving device for the downlink portion and the transmitting device for the uplink portion.

Figure 14:
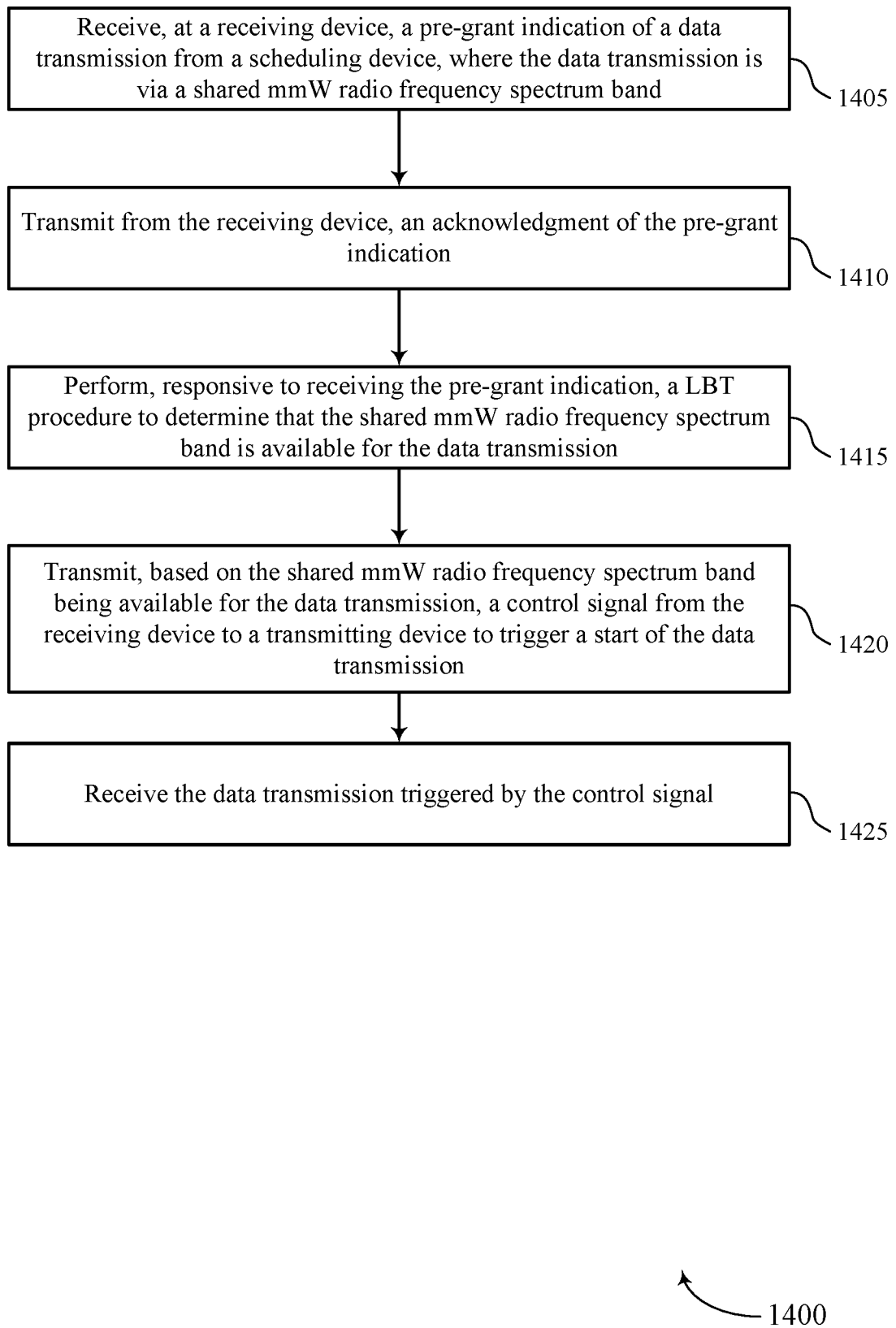

FIG. 14 shows a flowchart illustrating a method 1400 that supports receiver-based listen before talk techniques in shared millimeter wave radio frequency spectrum in accordance with aspects of the present disclosure. The operations of method 1400 may be implemented by a UE 115 or base station 105 or its components as described herein. For example, the operations of method 1400 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may receive, at a receiving device, a pre-grant indication of a data transmission from a scheduling device, where the data transmission is via a shared mmW radio frequency spectrum band. The operations of 1405 may be performed according to the methods described herein. In some examples, aspects of the operations of 1405 may be performed by a pre-grant indication component as described with reference to FIGS. 8 through 12.

At 1410, the UE or base station may transmit from the receiving device, before performing the LBT procedure, an acknowledgment of the pre-grant indication. The operations of 1410 may be performed according to the methods described herein. In some examples, aspects of the operations of 1410 may be performed by a pre-grant indication component as described with reference to FIGS. 8 through 12.

At 1415, the UE or base station may perform, responsive to receiving the pre-grant indication, a LBT procedure to determine that the shared mmW radio frequency spectrum band is available for the data transmission. The operations of 1415 may be performed according to the methods described herein. In some examples, aspects of the operations of 1415 may be performed by a LBT manager as described with reference to FIGS. 8 through 12. In some cases, the acknowledgment of the pre-grant indication is transmitted based on the reception of the pre-grant indication and an interference level associated with the pre-grant indication being below a threshold value. In some cases, the acknowledgment of the pre-grant indication is short control signaling that is exempt from CCA.

At 1420, the UE or base station may transmit, based on the shared mmW radio frequency spectrum band being available for the data transmission, a control signal from the receiving device to a transmitting device to trigger a start of the data transmission. The operations of 1420 may be performed according to the methods described herein. In some examples, aspects of the operations of 1420 may be performed by a transmission trigger component as described with reference to FIGS. 8 through 12.

At 1425, the UE or base station may receive the data transmission triggered by the control signal. The operations of 1425 may be performed according to the methods described herein. In some examples, aspects of the operations of 1425 may be performed by a data transmission component as described with reference to FIGS. 8 through 12.

Figure 15:
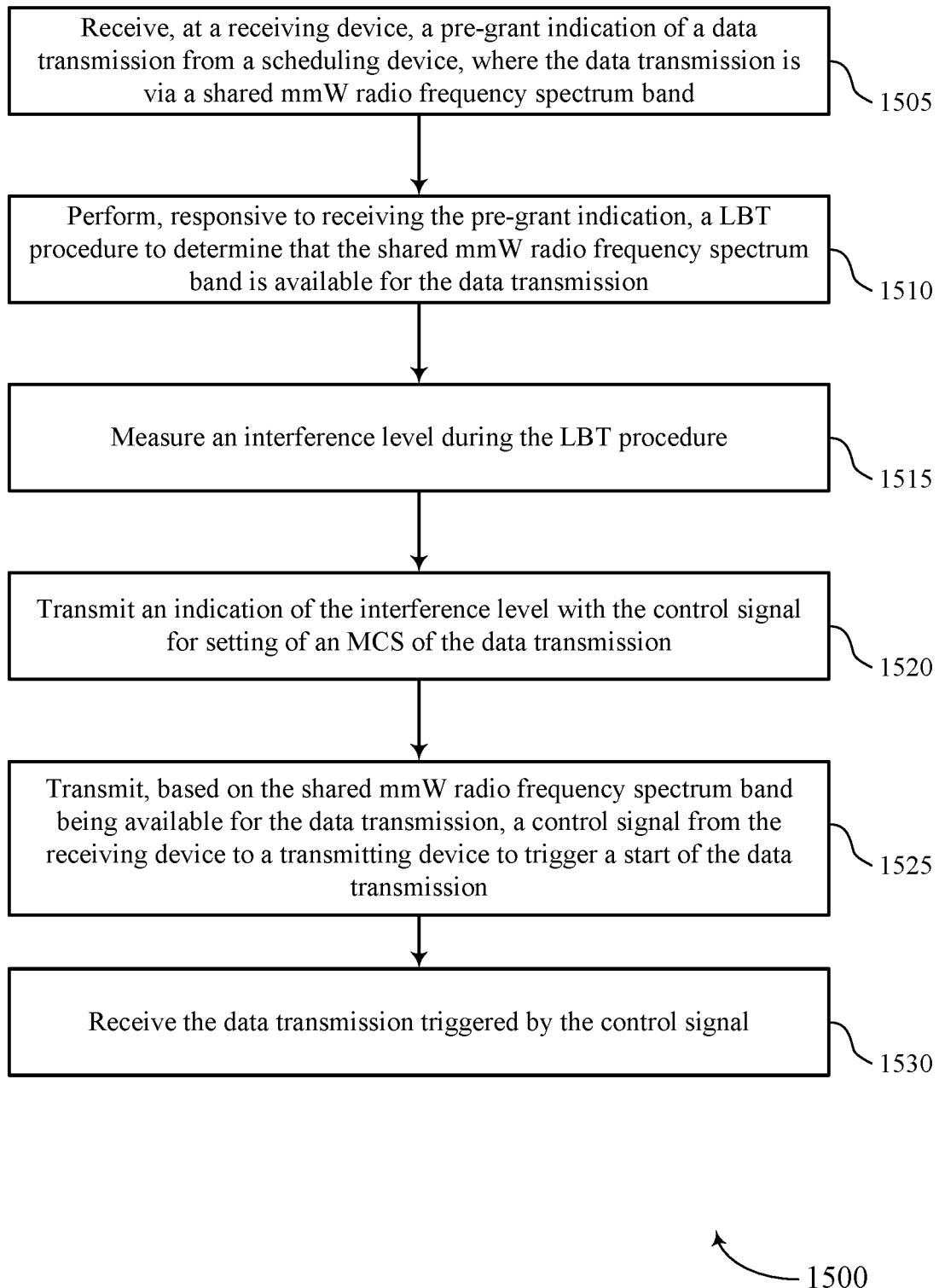

FIG. 15 shows a flowchart illustrating a method 1500 that supports receiver-based listen before talk techniques in shared millimeter wave radio frequency spectrum in accordance with aspects of the present disclosure. The operations of method 1500 may be implemented by a UE 115 or base station 105 or its components as described herein. For example, the operations of method 1500 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may receive, at a receiving device, a pre-grant indication of a data transmission from a scheduling device, where the data transmission is via a shared mmW radio frequency spectrum band. The operations of 1505 may be performed according to the methods described herein. In some examples, aspects of the operations of 1505 may be performed by a pre-grant indication component as described with reference to FIGS. 8 through 12.

At 1510, the UE or base station may perform, responsive to receiving the pre-grant indication, a LBT procedure to determine that the shared mmW radio frequency spectrum band is available for the data transmission. The operations of 1510 may be performed according to the methods described herein. In some examples, aspects of the operations of 1510 may be performed by a LBT manager as described with reference to FIGS. 8 through 12.

At 1515, the UE or base station may measure an interference level during the LBT procedure. The operations of 1515 may be performed according to the methods described herein. In some examples, aspects of the operations of 1515 may be performed by an interference level component as described with reference to FIGS. 8 through 12.

At 1520, the UE or base station may transmit an indication of the interference level with the control signal for setting of an MCS of the data transmission. The operations of 1520 may be performed according to the methods described herein. In some examples, aspects of the operations of 1520 may be performed by an interference level component as described with reference to FIGS. 8 through 12.

At 1525, the UE or base station may transmit, based on the shared mmW radio frequency spectrum band being available for the data transmission, a control signal from the receiving device to a transmitting device to trigger a start of the data transmission. The operations of 1525 may be performed according to the methods described herein. In some examples, aspects of the operations of 1525 may be performed by a transmission trigger component as described with reference to FIGS. 8 through 12.

At 1530, the UE or base station may receive the data transmission triggered by the control signal. The operations of 1530 may be performed according to the methods described herein. In some examples, aspects of the operations of 1530 may be performed by a data transmission component as described with reference to FIGS. 8 through 12.

Figure 16:
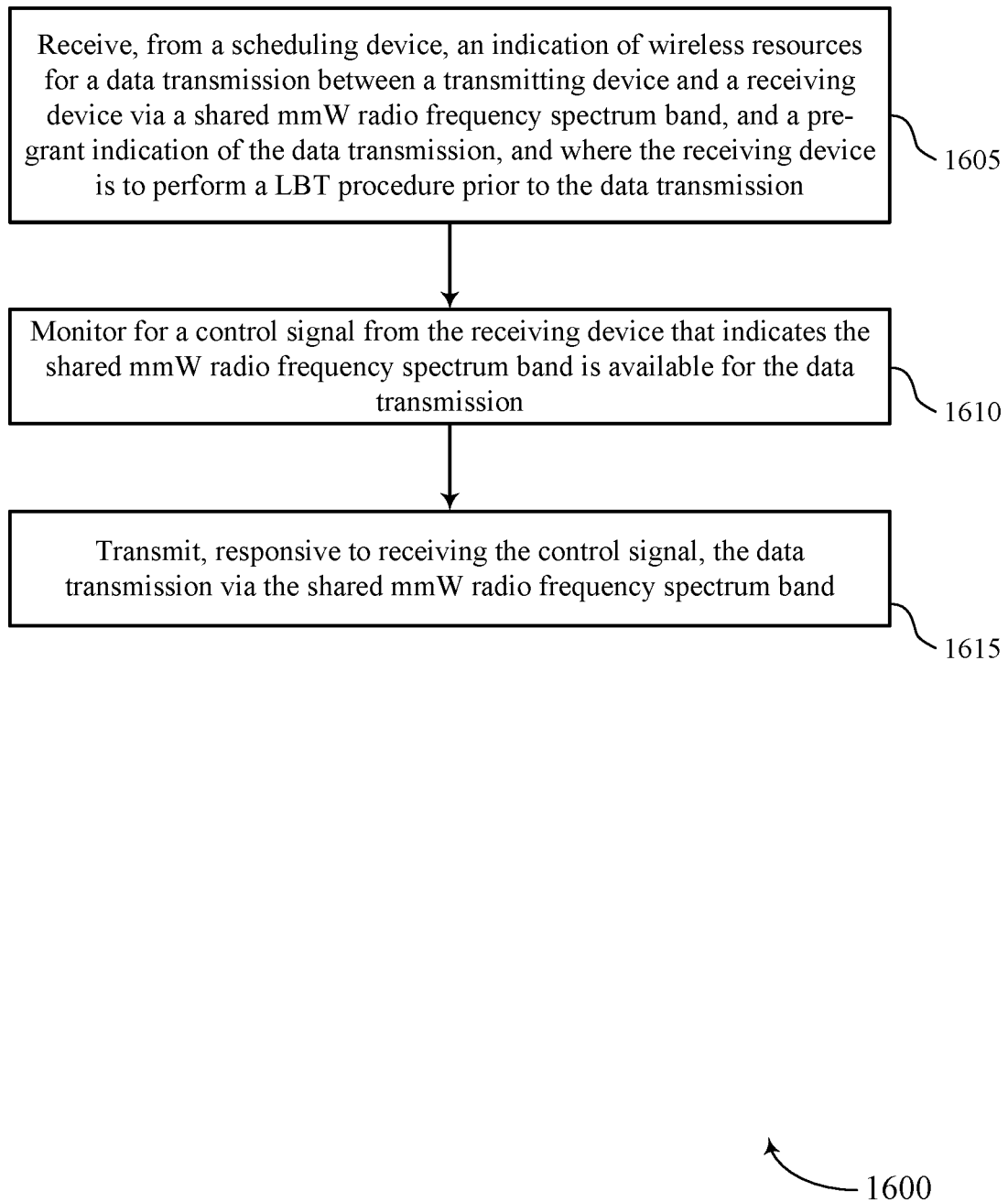

FIG. 16 shows a flowchart illustrating a method 1600 that supports receiver-based listen before talk techniques in shared millimeter wave radio frequency spectrum in accordance with aspects of the present disclosure. The operations of method 1600 may be implemented by a UE 115 or base station 105 or its components as described herein. For example, the operations of method 1600 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission. The operations of 1605 may be performed according to the methods described herein. In some examples, aspects of the operations of 1605 may be performed by a pre-grant indication component as described with reference to FIGS. 8 through 12. In some cases, the pre-grant indication of the data transmission includes an LBT length parameter, and where a duration of the LBT procedure is based on the LBT length parameter. In some cases, the LBT procedure is a CCA check using ED for a duration of a CCA observation time, where the CCA observation time is based in part on a random number that is selected for a number of CCA slots to measure channel energy, and where the LBT length parameter includes the random number.

At 1610, the UE or base station may monitor for a control signal from the receiving device that indicates the shared mmW radio frequency spectrum band is available for the data transmission. The operations of 1610 may be performed according to the methods described herein. In some examples, aspects of the operations of 1610 may be performed by a transmission trigger component as described with reference to FIGS. 8 through 12.

At 1615, the UE or base station may transmit, responsive to receiving the control signal, the data transmission via the shared mmW radio frequency spectrum band. The operations of 1615 may be performed according to the methods described herein. In some examples, aspects of the operations of 1615 may be performed by a data transmission component as described with reference to FIGS. 8 through 12. In some cases, the data transmission is a downlink-centric data transmission within a transmission opportunity (TxOP), and where the scheduling device and the transmitting device are components of a base station, and the receiving device is a UE. In some cases, the data transmission is an uplink-centric data transmission within a TxOP, and where the scheduling device and the receiving device are components of the base station and the transmitting device is the UE. In some cases, the data transmission includes a downlink data portion and an uplink data portion within a TxOP, where the scheduling device is a components of the base station, and where the base station is the transmitting device for the downlink portion and the receiving device for the uplink portion, and the UE is the receiving device for the downlink portion and the transmitting device for the uplink portion.

Figure 17:
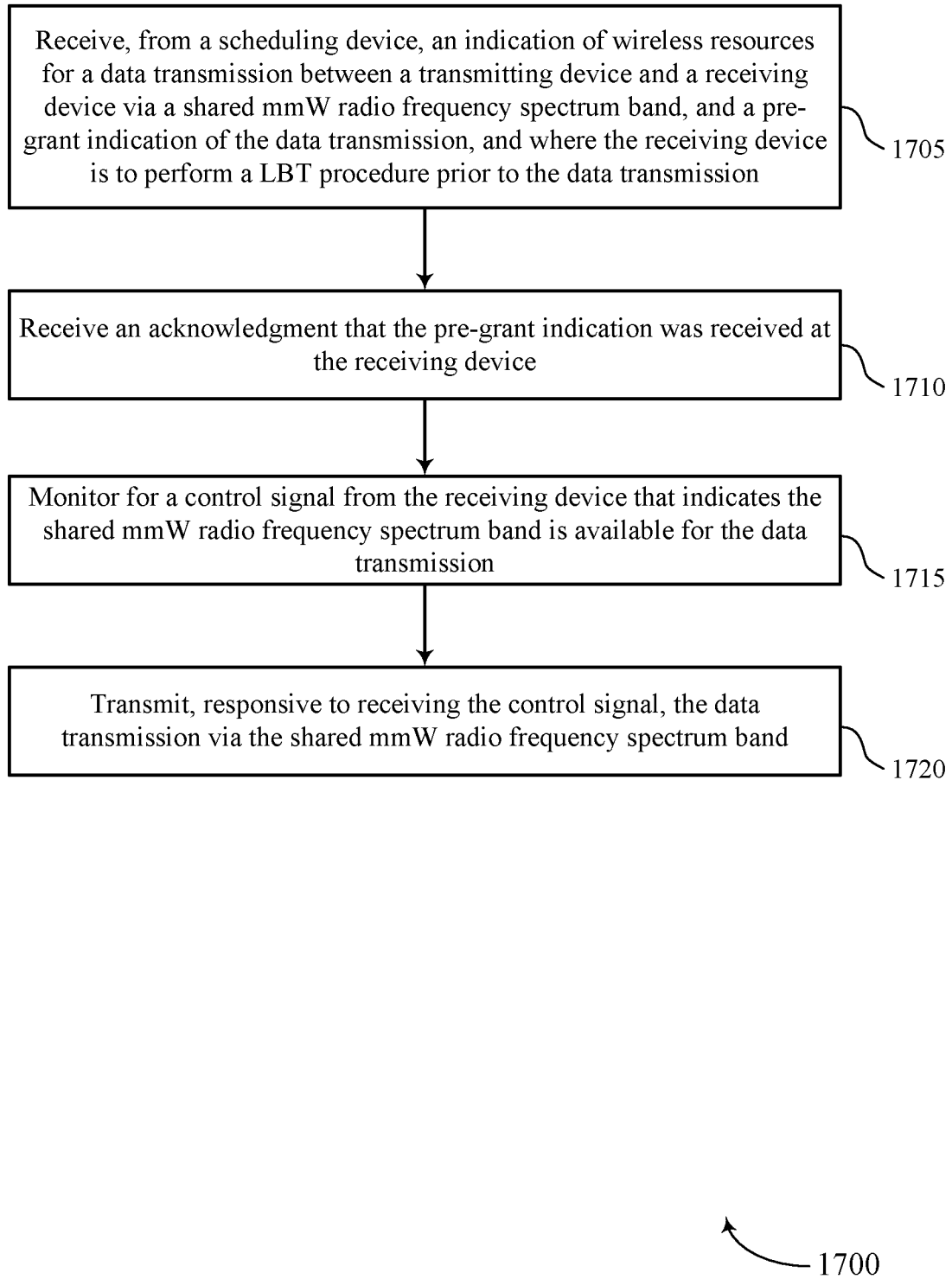

FIG. 17 shows a flowchart illustrating a method 1700 that supports receiver-based listen before talk techniques in shared millimeter wave radio frequency spectrum in accordance with aspects of the present disclosure. The operations of method 1700 may be implemented by a UE 115 or base station 105 or its components as described herein. For example, the operations of method 1700 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission. The operations of 1705 may be performed according to the methods described herein. In some examples, aspects of the operations of 1705 may be performed by a pre-grant indication component as described with reference to FIGS. 8 through 12.

At 1710, the UE or base station may receive, before the monitoring for the control signal, an acknowledgment that the pre-grant indication was received at the receiving device. The operations of 1710 may be performed according to the methods described herein. In some examples, aspects of the operations of 1710 may be performed by a pre-grant indication component as described with reference to FIGS. 8 through 12. In some cases, the acknowledgment of the pre-grant indication is transmitted based on an interference level measured during the LBT procedure. In some cases, the acknowledgment of the pre-grant indication is short control signaling that is exempt from the LBT procedure.

At 1715, the UE or base station may monitor for a control signal from the receiving device that indicates the shared mmW radio frequency spectrum band is available for the data transmission. The operations of 1715 may be performed according to the methods described herein. In some examples, aspects of the operations of 1715 may be performed by a transmission trigger component as described with reference to FIGS. 8 through 12.

At 1720, the UE or base station may transmit, responsive to receiving the control signal, the data transmission via the shared mmW radio frequency spectrum band. The operations of 1720 may be performed according to the methods described herein. In some examples, aspects of the operations of 1720 may be performed by a data transmission component as described with reference to FIGS. 8 through 12.

Figure 18:
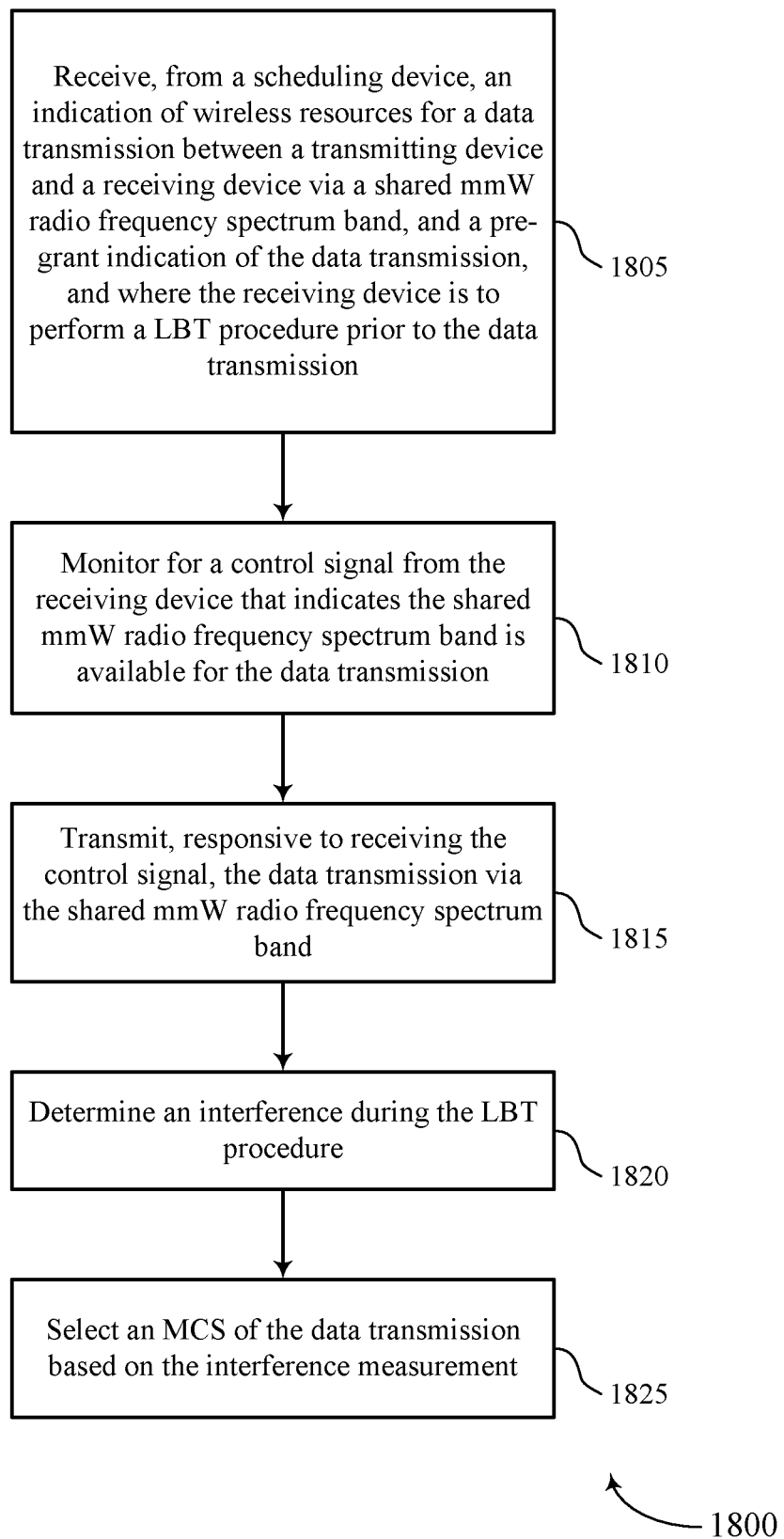

FIG. 18 shows a flowchart illustrating a method 1800 that supports receiver-based listen before talk techniques in shared millimeter wave radio frequency spectrum in accordance with aspects of the present disclosure. The operations of method 1800 may be implemented by a UE 115 or base station 105 or its components as described herein. For example, the operations of method 1800 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may receive, from a scheduling device, an indication of wireless resources for a data transmission between a transmitting device and a receiving device via a shared mmW radio frequency spectrum band, and a pre-grant indication of the data transmission, and where the receiving device is to perform a LBT procedure prior to the data transmission. The operations of 1805 may be performed according to the methods described herein. In some examples, aspects of the operations of 1805 may be performed by a pre-grant indication component as described with reference to FIGS. 8 through 12.

At 1810, the UE or base station may monitor for a control signal from the receiving device that indicates the shared mmW radio frequency spectrum band is available for the data transmission. The operations of 1810 may be performed according to the methods described herein. In some examples, aspects of the operations of 1810 may be performed by a transmission trigger component as described with reference to FIGS. 8 through 12.

At 1815, the UE or base station may transmit, responsive to receiving the control signal, the data transmission via the shared mmW radio frequency spectrum band. The operations of 1815 may be performed according to the methods described herein. In some examples, aspects of the operations of 1815 may be performed by a data transmission component as described with reference to FIGS. 8 through 12.

At 1820, the UE or base station may determine an interference during the LBT procedure. The operations of 1820 may be performed according to the methods described herein. In some examples, aspects of the operations of 1820 may be performed by an interference level component as described with reference to FIGS. 8 through 12.

At 1825, the UE or base station may select an MCS of the data transmission based on the interference measurement. The operations of 1825 may be performed according to the methods described herein. In some examples, aspects of the operations of 1825 may be performed by an interference level component as described with reference to FIGS. 8 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a receiving device, a pre-grant indication of a data transmission from a scheduling device, wherein the data transmission is via a shared millimeter wave (mmW) radio frequency spectrum band;
   performing, responsive to receiving the pre-grant indication, a listen-before-talk (LBT) procedure to determine that the shared mmW radio frequency spectrum band is available for the data transmission, wherein the LBT procedure is a clear channel assessment (CCA) check using energy detection (ED) for a duration of a CCA observation time;
   transmitting, based at least in part on the shared mmW radio frequency spectrum band being available for the data transmission, a control signal from the receiving device to a transmitting device to trigger a start of the data transmission; and
   receiving the data transmission triggered by the control signal.

2. The method of claim 1, wherein the pre-grant indication of the data transmission includes an LBT length parameter, and wherein a duration of the LBT procedure is based at least in part on the LBT length parameter.

3. The method of claim 2, wherein the CCA observation time is based in part on a random number that is selected for a number of CCA slots to measure channel energy, and wherein the LBT length parameter comprises the random number.

4. The method of claim 1, wherein the data transmission is a downlink-centric data transmission within a transmission opportunity (TxOP), and wherein the scheduling device and the transmitting device are a base station, and the receiving device is a user equipment (UE).

5. The method of claim 1, wherein the data transmission is an uplink-centric data transmission within a transmission opportunity (TxOP), and wherein the scheduling device and the receiving device are a base station and the transmitting device is a UE.

6. The method of claim 1, wherein the data transmission includes a downlink data portion and an uplink data portion within a transmission opportunity (TxOP), wherein the scheduling device is a base station, and wherein the base station is the transmitting device for the downlink portion and the receiving device for the uplink portion, and a UE is the receiving device for the downlink portion and the transmitting device for the uplink portion.

7. The method of claim 1, wherein the control signal comprises a trigger indicator that the shared mmW radio frequency spectrum band is available for the data transmission and padding that provides time for the transmitting device to process the trigger indicator and initiate the data transmission within a time threshold after the control signal.

8. The method of claim 1, wherein the pre-grant indication is a short control signaling transmission that is exempt from the LBT procedure.

9. The method of claim 1, wherein the LBT procedure is performed based on a beamformed receiving beam that is to be used for receiving the data transmission.

10. The method of claim 1, further comprising:
    transmitting from the receiving device, before performing the LBT procedure, an acknowledgment of the pre-grant indication.

11. The method of claim 10, wherein the acknowledgment of the pre-grant indication is transmitted based at least in part on the reception of the pre-grant indication and an interference level associated with the pre-grant indication being below a threshold value.

12. The method of claim 10, wherein the acknowledgment of the pre-grant indication is short control signaling that is exempt from CCA.

13. The method of claim 1, further comprising:
    measuring an interference level during the LBT procedure; and
    transmitting an indication of the interference level with the control signal for setting of a modulation and coding scheme (MCS) of the data transmission.

14. The method of claim 1, wherein the pre-grant indication further indicates a second data transmission from the receiving device to the transmitting device, and wherein the receiving device prepares the second data transmission responsive to the pre-grant indication, and wherein the method further comprises:
    transmitting the second data transmission responsive to a second trigger received from the transmitting device.

15. The method of claim 1, wherein the data transmission is a first data transmission, and wherein the pre-grant indication further indicates a second data transmission from the receiving device to the transmitting device to be transmitted after the first data transmission; and wherein the method further comprises:
    receiving a second trigger from the transmitting device in the data transmission; and transmitting the second data transmission responsive to the second trigger.

16. A method for wireless communication, comprising:
receiving, from a scheduling device, an indication of wireless resources for a data transmission between a transmitting device and a receiving device via a shared millimeter wave (mmW) radio frequency spectrum band, and a pre-grant indication of the data transmission, and wherein the receiving device is to perform a listen-before-talk (LBT) procedure prior to the data transmission, and wherein the LBT procedure is a clear channel assessment (CCA) check using energy detection (ED) for a duration of a CCA observation time;
monitoring for a control signal from the receiving device that indicates the shared mmW radio frequency spectrum band is available for the data transmission; and
transmitting, responsive to receiving the control signal, the data transmission via the shared mmW radio frequency spectrum band.

17. The method of claim 16, wherein the pre-grant indication of the data transmission includes an LBT length parameter, and wherein a duration of the LBT procedure is based at least in part on the LBT length parameter.

18. The method of claim 17, wherein the CCA observation time is based in part on a random number that is selected for a number of CCA slots to measure channel energy, and wherein the LBT length parameter comprises the random number.

19. The method of claim 16, wherein the data transmission is a downlink-centric data transmission within a transmission opportunity (TxOP), and wherein the scheduling device and the transmitting device are components of a base station, and the receiving device is a user equipment (UE).

20. The method of claim 16, wherein the data transmission is an uplink-centric data transmission within a transmission opportunity (TxOP), and wherein the scheduling device and the receiving device are components of a base station and the transmitting device is a UE.

21. The method of claim 16, wherein the data transmission includes a downlink data portion and an uplink data portion within a transmission opportunity (TxOP), wherein the scheduling device is a component of a base station, and wherein the base station is the transmitting device for the downlink portion and the receiving device for the uplink portion, and a UE is the receiving device for the downlink portion and the transmitting device for the uplink portion.

22. The method of claim 16, wherein the control signal comprises a trigger indicator that the shared mmW radio frequency spectrum band is available for the data transmission and padding that provides time for the transmitting device to process the trigger indicator and initiate the data transmission within a time threshold after the control signal.

23. The method of claim 16, wherein the pre-grant indication is a short control signaling transmission that is exempt from the LBT procedure.

24. The method of claim 16, further comprising:
receiving, before the monitoring for the control signal, an acknowledgment that the pre-grant indication was received at the receiving device.

25. The method of claim 24, wherein the acknowledgment of the pre-grant indication is transmitted based at least in part on an interference level measured during the LBT procedure.

26. The method of claim 24, wherein the acknowledgment of the pre-grant indication is short control signaling that is exempt from the LBT procedure.

27. The method of claim 16, further comprising:
determining an interference measurement during the LBT procedure; and
selecting a modulation and coding scheme (MCS) of the data transmission based at least in part on the interference measurement.

28. The method of claim 16, wherein the pre-grant indication further indicates a second data transmission from the receiving device to the transmitting device, and wherein the method further comprises:
performing an LBT procedure to determine that the shared mmW radio frequency spectrum band is available for the second data transmission;
transmitting a trigger to the receiving device to initiate transmission of the second data transmission; and
receiving the second data transmission.

29. An apparatus for wireless communication, comprising:
a processor,
memory coupled with the processor; and
instructions stored in the memory and executable by the processor to cause the apparatus to:
receive, at a receiving device, a pre-grant indication of a data transmission from a scheduling device, wherein the data transmission is via a shared millimeter wave (mmW) radio frequency spectrum band;
perform, responsive to receiving the pre-grant indication, a listen-before-talk (LBT) procedure to determine that the shared mmW radio frequency spectrum band is available for the data transmission, wherein the LBT procedure is a clear channel assessment (CCA) check using energy detection (ED) for a duration of a CCA observation time;
transmit, based at least in part on the shared mmW radio frequency spectrum band being available for the data transmission, a control signal from the receiving device to a transmitting device to trigger a start of the data transmission; and
receive the data transmission triggered by the control signal.

30. The apparatus of claim 29, wherein the pre-grant indication of the data transmission includes an LBT length parameter, and wherein a duration of the LBT procedure is based at least in part on the LBT length parameter.

31. The apparatus of claim 30, wherein the CCA observation time is based in part on a random number that is selected for a number of CCA slots to measure channel energy, and wherein the LBT length parameter comprises the random number.

32. The apparatus of claim 29, wherein the data transmission is a downlink-centric data transmission within a transmission opportunity (TxOP), and wherein the scheduling device and the transmitting device are a base station, and the receiving device is a user equipment (UE).

33. The apparatus of claim 29, wherein the data transmission is an uplink-centric data transmission within a transmission opportunity (TxOP), and wherein the scheduling device and the receiving device are a base station and the transmitting device is a UE.

34. The apparatus of claim 29, wherein the data transmission includes a downlink data portion and an uplink data portion within a transmission opportunity (TxOP), wherein the scheduling device is a base station, and wherein the base station is the transmitting device for the downlink portion and the receiving device for the uplink portion, and a UE is the receiving device for the downlink portion and the transmitting device for the uplink portion.

35. The apparatus of claim 29, wherein the control signal comprises a trigger indicator that the shared mmW radio frequency spectrum band is available for the data transmission and padding that provides time for the transmitting device to process the trigger indicator and initiate the data transmission within a time threshold after the control signal.

36. The apparatus of claim 29, wherein the pre-grant indication is a short control signaling transmission that is exempt from the LBT procedure.

37. The apparatus of claim 29, wherein the LBT procedure is performed based on a beamformed receiving beam that is to be used for receiving the data transmission.

38. The apparatus of claim 29, wherein the instructions are further executable by the processor to cause the apparatus to:
transmit from the receiving device, before performing the LBT procedure, an acknowledgment of the pre-grant indication.

39. The apparatus of claim 38, wherein the acknowledgment of the pre-grant indication is transmitted based at least in part on the reception of the pre-grant indication and an interference level associated with the pre-grant indication being below a threshold value.

40. The apparatus of claim 38, wherein the acknowledgment of the pre-grant indication is short control signaling that is exempt from CCA.

41. The apparatus of claim 29, wherein the instructions are further executable by the processor to cause the apparatus to:
measure an interference level during the LBT procedure; and
transmit an indication of the interference level with the control signal for setting of a modulation and coding scheme (MCS) of the data transmission.

42. The apparatus of claim 29, wherein the pre-grant indication further indicates a second data transmission from the receiving device to the transmitting device, and wherein the instructions are further executable by the processor to cause the apparatus to:
transmit the second data transmission responsive to a second trigger received from the transmitting device.

43. The apparatus of claim 29, wherein the data transmission is a first data transmission, and wherein the instructions are further executable by the processor to cause the apparatus to:
receive a second trigger from the transmitting device in the data transmission; and
transmit a second data transmission responsive to the second trigger.

44. An apparatus for wireless communication, comprising:
a processor,
memory coupled with the processor; and
instructions stored in the memory and executable by the processor to cause the apparatus to:
receive, from a scheduling device, an indication of wireless resources for a data transmission between a transmitting device and a receiving device via a shared millimeter wave (mmW) radio frequency spectrum band, and a pre-grant indication of the data transmission, and wherein the receiving device is to perform a listen-before-talk (LBT) procedure prior to the data transmission, and wherein the LBT procedure is a clear channel assessment (CCA) check using energy detection (ED) for a duration of a CCA observation time;
monitor for a control signal from the receiving device that indicates the shared mmW radio frequency spectrum band is available for the data transmission; and
transmit, responsive to receiving the control signal, the data transmission via the shared millimeter wave (mmW) radio frequency spectrum band.

45. The apparatus of claim 44, wherein the pre-grant indication of the data transmission includes an LBT length parameter, and wherein a duration of the LBT procedure is based at least in part on the LBT length parameter.

46. The apparatus of claim 45, wherein the CCA observation time is based in part on a random number that is selected for a number of CCA slots to measure channel energy, and wherein the LBT length parameter comprises the random number.

47. The apparatus of claim 44, wherein the data transmission is a downlink-centric data transmission within a transmission opportunity (TxOP), and wherein the scheduling device and the transmitting device are components of a base station, and the receiving device is a user equipment (UE).

48. The apparatus of claim 44, wherein the data transmission is an uplink-centric data transmission within a transmission opportunity (TxOP), and wherein the scheduling device and the receiving device are components of a base station and the transmitting device is a UE.

49. The apparatus of claim 44, wherein the data transmission includes a downlink data portion and an uplink data portion within a transmission opportunity (TxOP), wherein the scheduling device is a component of a base station, and wherein the base station is the transmitting device for the downlink portion and the receiving device for the uplink portion, and a UE is the receiving device for the downlink portion and the transmitting device for the uplink portion.

50. The apparatus of claim 44, wherein the control signal comprises a trigger indicator that the shared mmW radio frequency spectrum band is available for the data transmission and padding that provides time for the transmitting device to process the trigger indicator and initiate the data transmission within a time threshold after the control signal.

51. The apparatus of claim 44, wherein the pre-grant indication is a short control signaling transmission that is exempt from the LBT procedure.

52. The apparatus of claim 44, wherein the instructions are further executable by the processor to cause the apparatus to:
receive, before the monitoring for the control signal, an acknowledgment that the pre-grant indication was received at the receiving device.

53. The apparatus of claim 52, wherein the acknowledgment of the pre-grant indication is transmitted based at least in part on an interference level measured during the LBT procedure.

54. The apparatus of claim 52, wherein the acknowledgment of the pre-grant indication is short control signaling that is exempt from the LBT procedure.

55. The apparatus of claim 44, wherein the instructions are further executable by the processor to cause the apparatus to:
determine an interference during the LBT procedure; and
select a modulation and coding scheme (MCS) of the data transmission based at least in part on the interference measurement.

56. The apparatus of claim 44, wherein the pre-grant indication further indicates a second data transmission from the receiving device to the transmitting device, and wherein the instructions are further executable by the processor to cause the apparatus to:
perform an LBT procedure to determine that the shared mmW radio frequency spectrum band is available for the second data transmission;
transmit a trigger to the receiving device to initiate transmission of the second data transmission; and
receive the second data transmission.

57. An apparatus for wireless communication, comprising:
means for receiving, at a receiving device, a pre-grant indication of a data transmission from a scheduling device, wherein the data transmission is via a shared millimeter wave (mmW) radio frequency spectrum band;
means for performing, responsive to receiving the pre-grant indication, a listen-before-talk (LBT) procedure to determine that the shared mmW radio frequency spectrum band is available for the data transmission, wherein the LBT procedure is a clear channel assessment (CCA) check using energy detection (ED) for a duration of a CCA observation time;
means for transmitting, based at least in part on the shared mmW radio frequency spectrum band being available for the data transmission, a control signal from the receiving device to a transmitting device to trigger a start of the data transmission; and
means for receiving the data transmission triggered by the control signal.

58. An apparatus for wireless communication, comprising:
means for receiving, from a scheduling device, an indication of wireless resources for a data transmission between a transmitting device and a receiving device via a shared millimeter wave (mmW) radio frequency spectrum band, and a pre-grant indication of the data transmission, and wherein the receiving device is to perform a listen-before-talk (LBT) procedure prior to the data transmission, and wherein the LBT procedure is a clear channel assessment (CCA) check using energy detection (ED) for a duration of a CCA observation time;
means for monitoring for a control signal from the receiving device that indicates the shared mmW radio frequency spectrum band is available for the data transmission; and
means for transmitting, responsive to receiving the control signal, the data transmission via the shared mmW radio frequency spectrum band.

59. A non-transitory computer-readable medium storing code for wireless communication, the code comprising instructions executable by a processor to:
receive, at a receiving device, a pre-grant indication of a data transmission from a scheduling device, wherein the data transmission is via a shared millimeter wave (mmW) radio frequency spectrum band;
perform, responsive to receiving the pre-grant indication, a listen-before-talk (LBT) procedure to determine that the shared mmW radio frequency spectrum band is available for the data transmission, wherein the LBT procedure is a clear channel assessment (CCA) check using energy detection (ED) for a duration of a CCA observation time;
transmit, based at least in part on the shared mmW radio frequency spectrum band being available for the data transmission, a control signal from the receiving device to a transmitting device to trigger a start of the data transmission; and
receive the data transmission triggered by the control signal.

60. A non-transitory computer-readable medium storing code for wireless communication, the code comprising instructions executable by a processor to:
receive, from a scheduling device, an indication of wireless resources for a data transmission between a transmitting device and a receiving device via a shared millimeter wave (mmW) radio frequency spectrum band, and a pre-grant indication of the data transmission, and wherein the receiving device is to perform a listen-before-talk (LBT) procedure prior to the data transmission, and wherein the LBT procedure is a clear channel assessment (CCA) check using energy detection (ED) for a duration of a CCA observation time;
monitor for a control signal from the receiving device that indicates the shared mmW radio frequency spectrum band is available for the data transmission; and
transmit, responsive to receiving the control signal, the data transmission via the shared mmW radio frequency spectrum band.

\* \* \* \* \*